United States Patent
Sanghi et al.

(10) Patent No.: US 10,372,199 B2
(45) Date of Patent: Aug. 6, 2019

(54) APPARATUS FOR MANAGING POWER AND RUNNING AND BOOTING AN INTER-PROCESSOR COMMUNICATION LINK BETWEEN INDEPENDENTLY OPERABLE PROCESSORS

(71) Applicant: Apple Inc., Cupertino, CA (US)

(72) Inventors: Karan Sanghi, San Jose, CA (US);
Saurabh Garg, San Jose, CA (US);
Haining Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/721,200

(22) Filed: Sep. 29, 2017

(65) Prior Publication Data

US 2018/0088660 A1 Mar. 29, 2018

Related U.S. Application Data

(62) Division of application No. 14/879,030, filed on Oct. 8, 2015, now Pat. No. 9,798,377.
(Continued)

(51) Int. Cl.
*G06F 11/00* (2006.01)
*G06F 1/3293* (2019.01)
(Continued)

(52) U.S. Cl.
CPC .......... *G06F 1/3293* (2013.01); *G06F 1/3228* (2013.01); *G06F 1/3243* (2013.01);
(Continued)

(58) Field of Classification Search
CPC .......................... G06F 11/1417; G06F 11/1471
See application file for complete search history.

(56) References Cited

U.S. PATENT DOCUMENTS

| 4,805,137 A | 2/1989 | Grant et al. |
| 4,949,299 A | 8/1990 | Pickett et al. |

(Continued)

FOREIGN PATENT DOCUMENTS

| EP | 3013008 A1 | 4/2016 |
| JP | H02306082 A | 12/1990 |

(Continued)

OTHER PUBLICATIONS

ECN L1 PM Substates with CLKREQ approved Aug. 23, 2012.
(Continued)

*Primary Examiner* — Charles Ehne
(74) *Attorney, Agent, or Firm* — Gazdzinski & Associates, PC

(57) ABSTRACT

Methods and apparatus for an inter-processor communication (IPC) link between two (or more) independently operable processors. In one aspect, the IPC protocol is based on a "shared" memory interface for run-time processing (i.e., the independently operable processors each share (either virtually or physically) a common memory interface). In another aspect, the IPC communication link is configured to support a host driven boot protocol used during a boot sequence to establish a basic communication path between the peripheral and the host processors. Various other embodiments described herein include sleep procedures (as defined separately for the host and peripheral processors), and error handling.

20 Claims, 21 Drawing Sheets

US 10,372,199 B2

Page 2

Related U.S. Application Data

(60) Provisional application No. 62/061,605, filed on Oct. 8, 2014.

(51) Int. Cl.
*G06F 1/3287* (2019.01)
*G06F 13/42* (2006.01)
*G06F 9/4401* (2018.01)
*G06F 11/14* (2006.01)
*G06F 1/3228* (2019.01)
*G06F 1/3234* (2019.01)

(52) U.S. Cl.
CPC .......... *G06F 1/3287* (2013.01); *G06F 9/4403* (2013.01); *G06F 9/4405* (2013.01); *G06F 9/4411* (2013.01); *G06F 11/1471* (2013.01); *G06F 13/4282* (2013.01); *G06F 11/1417* (2013.01); *G06F 11/1474* (2013.01); *G06F 2201/805* (2013.01); *G06F 2201/87* (2013.01); *Y02D 10/122* (2018.01); *Y02D 10/14* (2018.01); *Y02D 10/151* (2018.01); *Y02D 10/152* (2018.01); *Y02D 10/171* (2018.01)

(56) References Cited

U.S. PATENT DOCUMENTS

| | | |
|---|---|---|
| 4,987,529 A | 1/1991 | Craft et al. |
| 5,367,688 A | 11/1994 | Croll |
| 5,467,459 A | 11/1995 | Alexander et al. |
| 5,485,578 A | 1/1996 | Sweazey |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,216,178 B1 | 4/2001 | Stracovsky et al. |
| 6,233,702 B1 | 5/2001 | Horst et al. |
| 6,359,863 B1 | 3/2002 | Varma et al. |
| 6,411,997 B1 | 6/2002 | Dawes et al. |
| 6,434,633 B1 | 8/2002 | Braun et al. |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,735,642 B2 | 5/2004 | Kagan et al. |
| 6,815,873 B2 | 11/2004 | Johnson et al. |
| 6,840,257 B2 | 1/2005 | Dario et al. |
| 6,843,465 B1 | 1/2005 | Scott |
| 6,947,442 B1 | 9/2005 | Sato et al. |
| 6,948,094 B2 | 9/2005 | Schultz et al. |
| 6,973,701 B2 | 12/2005 | Momoda et al. |
| 7,013,536 B2 | 3/2006 | Golden et al. |
| 7,032,282 B2 | 4/2006 | Powell et al. |
| 7,055,793 B2 | 6/2006 | Biehl et al. |
| 7,100,020 B1 | 8/2006 | Brightman et al. |
| 7,127,600 B2 | 10/2006 | Zimmer et al. |
| 7,191,240 B1 | 3/2007 | Johnson |
| 7,281,172 B2 | 10/2007 | Chujo |
| 7,347,221 B2 | 3/2008 | Berger et al. |
| 7,397,774 B1 | 7/2008 | Holland et al. |
| 7,398,382 B2 | 7/2008 | Rothman et al. |
| 7,509,391 B1 | 3/2009 | Chauvel et al. |
| 7,650,914 B2 | 1/2010 | Bogursky et al. |
| 7,681,012 B2 | 3/2010 | Verm et al. |
| 7,685,476 B2 | 3/2010 | Andre et al. |
| 7,853,731 B1 | 12/2010 | Zeng |
| 7,899,941 B2 | 3/2011 | Hendry et al. |
| 7,926,520 B2 | 4/2011 | Bogursky et al. |
| 7,941,682 B2 | 5/2011 | Adams |
| 8,113,243 B2 | 2/2012 | Bogursky et al. |
| 8,255,725 B2 | 8/2012 | Shimazaki et al. |
| 8,352,624 B2 * | 1/2013 | Zimmerman ........... H04L 67/06 709/217 |
| 8,422,404 B2 | 4/2013 | Taki |
| 8,468,285 B2 | 6/2013 | Kobayashi |
| 8,540,206 B2 | 9/2013 | Foshansky et al. |
| 8,635,412 B1 | 1/2014 | Wilshire |
| 8,656,228 B2 | 2/2014 | Check et al. |
| 8,788,822 B1 | 7/2014 | Riddle |
| 8,799,537 B1 | 8/2014 | Zhu et al. |
| 8,808,091 B2 | 8/2014 | Shaw et al. |
| 8,819,386 B1 | 8/2014 | Mather |
| 8,832,331 B2 | 9/2014 | Co |
| 8,848,809 B2 | 9/2014 | Whitby-Strevens |
| 8,851,443 B2 | 10/2014 | Foshansky |
| 8,876,062 B1 | 11/2014 | Baghdasarian |
| 8,939,180 B2 | 1/2015 | Bogursky et al. |
| 8,946,934 B2 | 2/2015 | Butts et al. |
| 9,027,903 B2 | 5/2015 | Arekar et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,544,069 B2 | 1/2017 | Whitby-Strevens et al. |
| 9,547,535 B1 | 1/2017 | Wilt |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager et al. |
| 2002/0013868 A1 | 1/2002 | West |
| 2002/0044553 A1 | 4/2002 | Chakravorty |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0086122 A1 | 5/2003 | Parry |
| 2003/0200413 A1 | 10/2003 | Gurumoorthy et al. |
| 2004/0044929 A1 | 3/2004 | Chujo |
| 2004/0064589 A1 | 4/2004 | Boucher et al. |
| 2004/0128568 A1 | 7/2004 | O'Shea |
| 2004/0179546 A1 | 9/2004 | McDaniel et al. |
| 2004/0201749 A1 | 10/2004 | Malloy |
| 2004/0221056 A1 | 11/2004 | Kobayashi |
| 2004/0228365 A1 | 11/2004 | Kobayashi |
| 2005/0005980 A1 | 1/2005 | Eberhardt et al. |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0285862 A1 | 12/2005 | Noda et al. |
| 2006/0039285 A1 | 2/2006 | Chapman et al. |
| 2006/0107071 A1 | 5/2006 | Girish et al. |
| 2006/0186700 A1 | 8/2006 | Browne et al. |
| 2006/0186706 A1 | 8/2006 | Browne et al. |
| 2006/0218301 A1 | 9/2006 | O'Toole et al. |
| 2006/0232051 A1 | 10/2006 | Morris et al. |
| 2007/0005869 A1 | 1/2007 | Balraj et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0118831 A1 | 5/2007 | Kondo |
| 2007/0180041 A1 | 8/2007 | Suzuoki |
| 2007/0201492 A1 | 8/2007 | Kobayashi |
| 2007/0226417 A1 | 9/2007 | Davis |
| 2007/0261307 A1 | 11/2007 | Alexander et al. |
| 2007/0286246 A1 | 12/2007 | Kobayashi |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |

(56) References Cited

U.S. PATENT DOCUMENTS

| | | |
|---|---|---|
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0024924 A1 | 1/2009 | Kim |
| 2009/0113141 A1 | 4/2009 | Bullman et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0282050 A1 | 11/2009 | Thomas et al. |
| 2009/0282088 A1 | 11/2009 | Thomas et al. |
| 2009/0322531 A1 | 12/2009 | Estevez et al. |
| 2010/0017655 A1 | 1/2010 | Gooding et al. |
| 2010/0030932 A1 | 2/2010 | Ergas et al. |
| 2010/0082859 A1 | 4/2010 | Hendry et al. |
| 2010/0098419 A1 | 4/2010 | Levy et al. |
| 2010/0329319 A1 | 12/2010 | Dai et al. |
| 2011/0029696 A1 | 2/2011 | Uehara |
| 2011/0035575 A1* | 2/2011 | Kwon .................. G06F 9/4405 713/2 |
| 2011/0052142 A1 | 3/2011 | Sultenfuss et al. |
| 2011/0083002 A1* | 4/2011 | Albers .................. G06F 9/4416 713/2 |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0151913 A1 | 6/2012 | Foshansky |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0111896 A1 | 5/2013 | Foshansky et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0122828 A1 | 5/2014 | Kagan et al. |
| 2014/0173236 A1 | 6/2014 | Kegel |
| 2014/0189057 A1* | 7/2014 | Sankoda ................ H04L 67/10 709/217 |
| 2014/0244866 A1 | 8/2014 | Manula et al. |
| 2014/0247983 A1 | 9/2014 | MacInnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0267690 A1 | 9/2015 | Foshansky et al. |
| 2015/0293873 A1 | 10/2015 | Shao et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0208539 A1 | 7/2016 | Hofmann et al. |
| 2016/0224442 A1 | 8/2016 | Sanghi et al. |
| 2016/0269991 A1 | 9/2016 | Van Greunen et al. |
| 2016/0299860 A1 | 10/2016 | Harriman |
| 2016/0364350 A1 | 12/2016 | Sanghi et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0249098 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0225251 A1 | 8/2018 | Sthoeger et al. |
| 2018/0367460 A1 | 12/2018 | Gao et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

Jackson, Budruk: "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

APPARATUS FOR MANAGING POWER AND RUNNING AND BOOTING AN INTER-PROCESSOR COMMUNICATION LINK BETWEEN INDEPENDENTLY OPERABLE PROCESSORS

PRIORITY AND RELATED APPLICATIONS

This application is a divisional of, and claims priority to, co-owned and co-pending U.S. patent application Ser. No. 14/879,030 filed Oct. 8, 2015 and entitled "Methods and Apparatus for Recovering Errors with an Inter-Processor Communication Link between Independently Operable Processors", which claims the benefit of priority to U.S. Provisional Patent Application Ser. No. 62/061,605 filed Oct. 8, 2014 and entitled "METHODS AND APPARATUS FOR AN INTER-PROCESSOR COMMUNICATION LINK BETWEEN INDEPENDENTLY OPERABLE PROCESSORS", incorporated herein by reference in its entirety.

This application is also related to commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015 and published as U.S. Patent Publication No. 2016/0103689, Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015 and published as U.S. Patent Publication No. 2016/0103480 and issued as U.S. Pat. No. 9,971,397, Ser. No. 14/856,283 entitled "METHODS AND APPARATUS FOR AGGREGATING PACKET TRANSFER OVER A VIRTUAL BUS INTERFACE", filed Sep. 16, 2015, and Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015, and commonly owned and U.S. Provisional Patent Application Ser. No. 62/175,174 entitled "METHODS AND APPARATUS FOR SYNCHRONIZING UPLINK AND DOWNLINK TRANSACTIONS ON AN INTER-PROCESSOR COMMUNICATION LINK" filed Jun. 12, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronics devices, as well as networks thereof. More particularly, in one exemplary aspect, the disclosure is directed to methods and apparatus for implementing an inter-processor communication (IPC) link between two (or more) independently operable processors. Various aspects of the present disclosure are directed to, inter alia, run time processing, power management, boot sequencing and error handling.

DESCRIPTION OF RELATED TECHNOLOGY

Various bus architectures and techniques have evolved over time which are able to handle increasingly faster data rates, and to provide higher levels of data throughput. One such example is Peripheral Component Interconnect Express (PCIe); see e.g., PCI Express Base Specification Revision 3.1 dated Oct. 8, 2014, which is incorporated herein by reference in its entirety. PCIe is a high-speed serial computer expansion bus standard designed to replace older PCI and similar bus standards. Consistent with the foregoing, PCIe has historically been used as serial computer expansion bus technology, and has had limited applicability beyond such applications.

In terms of architecture, PCIe is based on point-to-point connectivity with separate serial links connecting every endpoint component (e.g., graphics card, memory, etc.) to the root complex (e.g., host processor).

PCIe has many desirable attributes in terms of, inter alia, performance and flexibility. However, PCIe (as well as some other existing "computer-centric" bus technologies) suffer certain disabilities, especially from the standpoint of portable consumer electronic device implementations. Specifically, as noted above, extant PCIe technologies were developed for use within desktop, server, and laptop computers, which are to varying degrees agnostic to many electrical power considerations affecting smaller portable devices. Desktops and servers (and to a lesser degree laptops) are less concerned with electrical power consumption/conservation, and more concerned with bus performance, ability to "hot plug", and the like. Accordingly, implementing a technology such as PCIe which, in its current incarnation, both (i) consumes significant electrical power during operation, and (ii) has limited power management infrastructure (e.g., application or host processor and chipset "sleep" states, and management of data and transactions during such sleep states), is generally unsuitable for portable consumer electronics applications where power consumption and battery conservation are critical (such as e.g., cellular- and Wi-Fi-enabled smartphones, "phablets", portable media players, etc.).

In a related aspect, extant PCIe connectivity is unable to accommodate scenarios where the "peripheral" processor is required to operate while the "host" processor is asleep or vice versa. Such operational scenarios and requirements are quite common with the aforementioned cellular devices, media players, and similar devices.

Hence, there is a need for improved apparatus and associated methods which can leverage the high data throughput and other desirable attributes of bus technologies such as PCIe (and other "memory mapped" technologies), yet support the requirements of rigorous power management and conservation, as well as the ability to support various combinations of operational sleep states or other reduced-power modes by various chipsets within the device (including e.g., wireless modems).

SUMMARY

The present disclosure satisfies the foregoing needs by providing, inter alia, methods and apparatus for implementing an inter-processor communication (IPC) link between two (or more) independently operable processors.

In one aspect, processor apparatus is disclosed. In one embodiment, the apparatus includes: a first and a second processor coupled via a physical bus interface; a shared memory interface configured to enable independent operation of the first and second processor; and a plurality of computer readable instructions. In one variant, the computer readable instructions are configured to, when executed by the first processor, cause the first processor to: transact one or more data structures via the shared memory interface; responsive to detection of an error, recover a previously transacted data structure; and thereafter, resume operation of the shared memory interface.

In another embodiment, the processor apparatus is adapted for use in a portable device, and includes: a first digital processor having a physical bus interface, the first digital processor being configured for data communication with a shared memory interface, the memory interface configured to enable independent operation of the first digital processor and one or more other digital processors of the device; and storage apparatus in data communication with the first digital processor. In one implementation, the storage apparatus includes a plurality of computer readable instructions configured to, when executed by the first digital processor, cause the first digital processor to: transact one or more data structures via the shared memory interface; responsive to detection of an error, recover a previously transacted data structure; and thereafter, cause resumption of operation of the shared memory interface.

In one variant, the processor apparatus further includes error correction apparatus in data communication with the first digital processor, the error correction apparatus configured to utilize at least one error correction scheme to attempt to correct the error before the recovery of the previously transacted data structure.

In another variant, the recovery of the previously transacted data structure comprises the first digital processor performing at least one of: (i) return of one or more state(s) of one or more last successful data transfer(s); and/or (ii) collection or provision of one or more reliable tail pointers for all reliable data pipes associated with the transaction of the one or more data structures.

In a further variant, the recovery of the previously transacted data structure comprises the first digital processor replicating at least a portion of data within one or more unreliable data pipes.

In another aspect, a method of operating a processor in a multi-processor system or apparatus is disclosed. In one embodiment, the method includes: determining an error associated with at least one data transaction; communicating information relating to the determined error to another processor within the multiprocessor system or apparatus; storing data relating to the error; and subsequently, and substantially in response to the other processor requesting at least some of the transacted data, providing at least a portion of the stored data relating to the error to the other processor.

In a further aspect, an error-tolerant integrated circuit apparatus is disclosed. In one embodiment, the apparatus includes a first processor; a second processor in data communication with the first processor: a storage apparatus in data communication with the first processor, the storage apparatus comprising at least one computer program configured to, when executed: detect an error associated with at least one data transaction being performed between the first processor and the second processor; communicate information relating to the determined error to the second processor; recover at least a portion of the transacted data; receive a request for at least some of the transacted data from the second processor; and provide at least a portion of the recovered transacted data to the second processor.

In one implementation, the first processor, second processor, and storage apparatus are all rendered as integrated circuitry on a common semiconductive die of the integrated circuit apparatus.

In another embodiment, the at least one data transaction is based at least in part on contents of one or more transfer descriptor rings (TDRs) comprising one or more transfer descriptors (TDs), each TD being associated with a virtualized data pipe; and the recovery comprises the first processor collecting one or more reliable tail pointers for all reliable data pipes associated with the transacted data, the one or more reliable tail pointers being associated with one or more data streams that have successfully completed via the virtualized data pipe.

In another embodiment, the integrated circuit apparatus is a System-on-Chip (SoC) device fabricated using a semiconductive fabrication process (e.g., 14 nm), and includes both a first digital processor and a second digital processor in data communication with the first digital processor via an inter-processor communications link. In one variant, the first and second digital processors include substantially similar first and second processor cores (e.g., a multi-core processor). In another variant, the first digital processor includes a primary processor (e.g., CPU), and the second digital processor includes a wireless base-band (BB) processor. In yet another variant, the second digital processor includes a graphics core (e.g., co-processor). In yet another variant, the SoC includes the primary processor, an auxiliary processor (e.g., ARM core or the like), and both the graphics core and the wireless BB core, each of the auxiliary, graphics and BB cores in inter-process communication with the primary processor. In another embodiment, the integrated circuit apparatus includes two or more discrete semiconductive die having one or more of the foregoing components disposed on each of the separate die.

In still another embodiment, the processor apparatus includes a first digital processor having a physical bus interface, the first digital processor being configured for data communication with a shared memory interface, the memory interface configured to enable independent operation of the first digital processor and one or more other digital processors; and a plurality of computer readable instructions, as well as an error detection apparatus. In one variant, the computer readable instructions are configured to, when executed by the first digital processor, cause the first digital processor to: transact one or more data structures via the shared memory interface; responsive to detection of an error using the error detection apparatus, recover a previously transacted data structure; and thereafter, cause resumption of operation of the shared memory interface. In one variant, the processor apparatus comprises an integrated circuit (IC). In another variant, the processor apparatus comprises a chipset having a plurality of integrated circuits (IC) associated therewith.

In yet another embodiment, the method includes: transacting one or more data structures via the shared memory interface; responsive to detection of an error, recovering a previously transacted data structure; and thereafter, resuming operation of the shared memory interface.

In another aspect of the present disclosure, a non-transitory computer-readable storage apparatus is disclosed. In one embodiment thereof, the non-transitory computer-readable storage apparatus includes computer computer-readable instructions that are configured to, when executed by a first digital processor apparatus: prior to transmission of a boot state image to a second digital processor apparatus, determine a current stage of execution for the second digital processor apparatus by a read operation of a shared memory interface by the first digital processor apparatus; and cause the first digital processor apparatus to transmit the boot stage image to the second digital processor apparatus via a physical bus interface.

In another aspect of the present disclosure, integrated circuit apparatus is disclosed. In one embodiment, the integrated circuit apparatus includes: a host processor apparatus; an auxiliary processor apparatus; and a shared memory interface comprising at least one data storage device, the shared memory interface in data communication with each of the host processor apparatus and the auxiliary processor apparatus; wherein the integrated circuit apparatus is further configured to: prior to transmission of a boot stage image to the auxiliary processor apparatus, determine a current stage of execution for the auxiliary processor apparatus by a read operation of the shared memory interface by the host processor apparatus; and cause the host processor apparatus to transmit the boot stage image to the auxiliary processor apparatus via a physical bus interface.

In another aspect of the present disclosure, a peripheral processor apparatus is disclosed. In one embodiment, the peripheral processor apparatus includes: a communication interface coupled to a shared memory space; wherein the peripheral processor apparatus is configured to: cause execution of an initial primary boot sequence; update a current execution stage for the peripheral processor apparatus by writing to the shared memory space, the update of the current execution stage configured to notify a host processor apparatus of the current execution stage for the peripheral processor apparatus; responsive to the update of the current execution stage in the shared memory space, receive a notification from the host processor apparatus; and responsive to receipt of the notification, retrieve a secondary boot image.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 9A-11A are logical representations of an alternate exemplary transfer descriptor ring (TDR) at various stages of processing, in accordance with the principles described herein.

Figure 1:
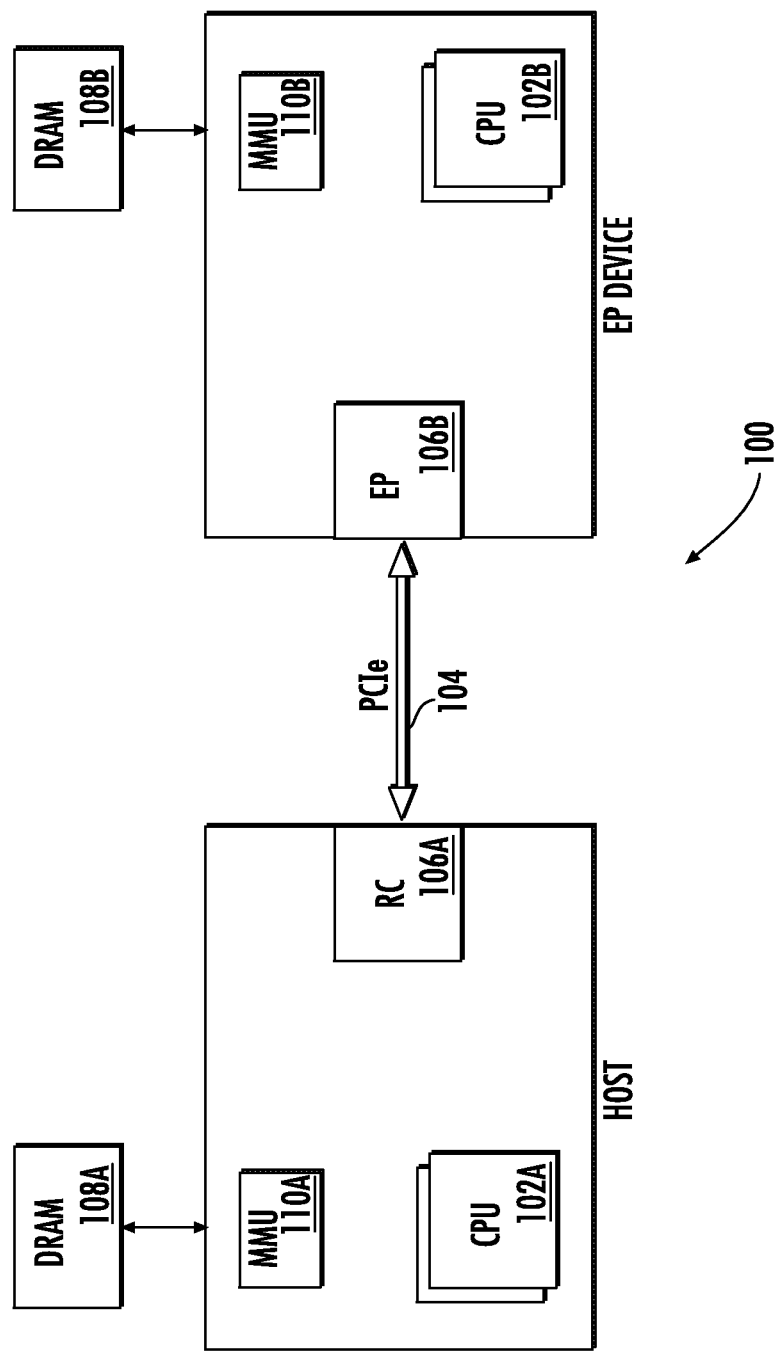
FIG. 1 is a logical block diagram of one exemplary apparatus useful for illustrating various principles described herein.

All Figures © Copyright 2014-2015 Apple Inc. All rights reserved.

DETAILED DESCRIPTION

Reference is now made to the drawings, wherein like numerals refer to like parts throughout.

DETAILED DESCRIPTION OF EXEMPLARY EMBODIMENTS

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/856,283 entitled "METHODS AND APPARATUS FOR AGGREGATING PACKET TRANSFER OVER A VIRTUAL BUS INTERFACE", filed Sep. 16, 2015, previously incorporated by reference in its entirety), it will be recognized by those of ordinary skill that the present disclosure is not so limited. In fact, the various aspects of the disclosure are useful in any device or network of devices that is configured to incorporate and coordinate multiple independent processing elements, as is disclosed herein.

Various embodiments described herein may be used in conjunction with power management schemes such as those described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCES- SORS", filed Oct. 8, 2015 and published as U.S. Patent Publication No. 2016/0103689, previously incorporated by reference in its entirety.

Additionally, various embodiments described herein may also be used in conjunction with error recovery schemes, such as those described within commonly owned and co-pending U.S. patent application Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015 and published as U.S. Patent Publication No. 2016/0103480 and issued as U.S. Pat. No. 9,971,397, previously incorporated by reference in its entirety.

Further, while the following embodiments describe specific implementations of e.g., dedicated address spaces, legacy support capabilities, and specific protocols, those of ordinary skill in the related arts will readily appreciate that such descriptions are purely illustrative.

Moreover, while exemplary implementations are described in the context of the PCIe protocol, it will be appreciated that the various features and techniques described herein can be applied to other bus protocols, including especially those based on memory-mapped schemes.

Exemplary Inter-Processor Communications Link

As previously noted, bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for most portable consumer electronics applications. Additionally, PCIe connectivity is unable to accommodate scenarios where the "peripheral" processor is required to operate while the "host" processor is asleep or vice versa (as is common with cellular devices and portable media players).

Within this context, exemplary methods and apparatus are now described which support an inter-processor communication (IPC) link between two (or more) independently operable processors. The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed.

In one aspect, the IPC protocol is based on a "shared" memory interface for run-time processing (i.e., the independently operable processors each share, either virtually or physically, a common memory interface). In one such embodiment, the shared memory interface provides a multi-channel IPC path for high throughput transfers. In one exemplary implementation, the shared memory interface remains functional when any one of the independently operable processors is active, even when one or more of the remaining independently operable processors are asleep, powered down, powered off, etc.

In another aspect, the IPC communication link is configured to support a host-driven boot protocol used during a boot sequence, so as to establish a basic communication path between the peripheral and the host processors. In one exemplary embodiment, the host processor maps the entire boot image to a contiguous area of memory, and provides the base address and size of the image over the IPC communication link to the peripheral processor.

Various other embodiments described herein include, inter alia, sleep procedures (as defined separately for the host and peripheral processors), and error handling.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers without limitation to data transactions which are transacted within a logical or physical interface, and which affect the mechanisms, attributes or functionalities of the logical or physical interface. In contrast, the term "out-of-band" refers to data transactions which are not transacted within a logical or physical interface, and which affect the mechanisms, attributes or functionalities of the logical or physical interface.

FIG. 1 illustrates exemplary apparatus 100 useful for illustrating various principles described herein. As shown, the apparatus 100 includes a first and second processor (102A, 102B), and a physical bus interface 104 that is configured to implement an inter-processor communication (IPC) link between two (or more) independently operable processors.

In one implementation, the first processor 102A includes an applications processor (AP). As shown in FIG. 1, the first processor 102A is coupled to a Root Complex (RC) 106A which functions as the host of the IPC bus.

In one implementation, the second processor 102B includes a wireless modem. As used herein, the term "wireless" includes, without limitation, Long Term Evolution/Advanced (LTE and LTE-A) technology, devices implementing IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band devices.

In other embodiments, the second processor 102B may be e.g., a media processor, or other network processing element. As shown in FIG. 1, the second processor 102B is coupled to an Endpoint (EP) 106B which functions as the peripheral of the IPC bus.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution.

Figure 2:
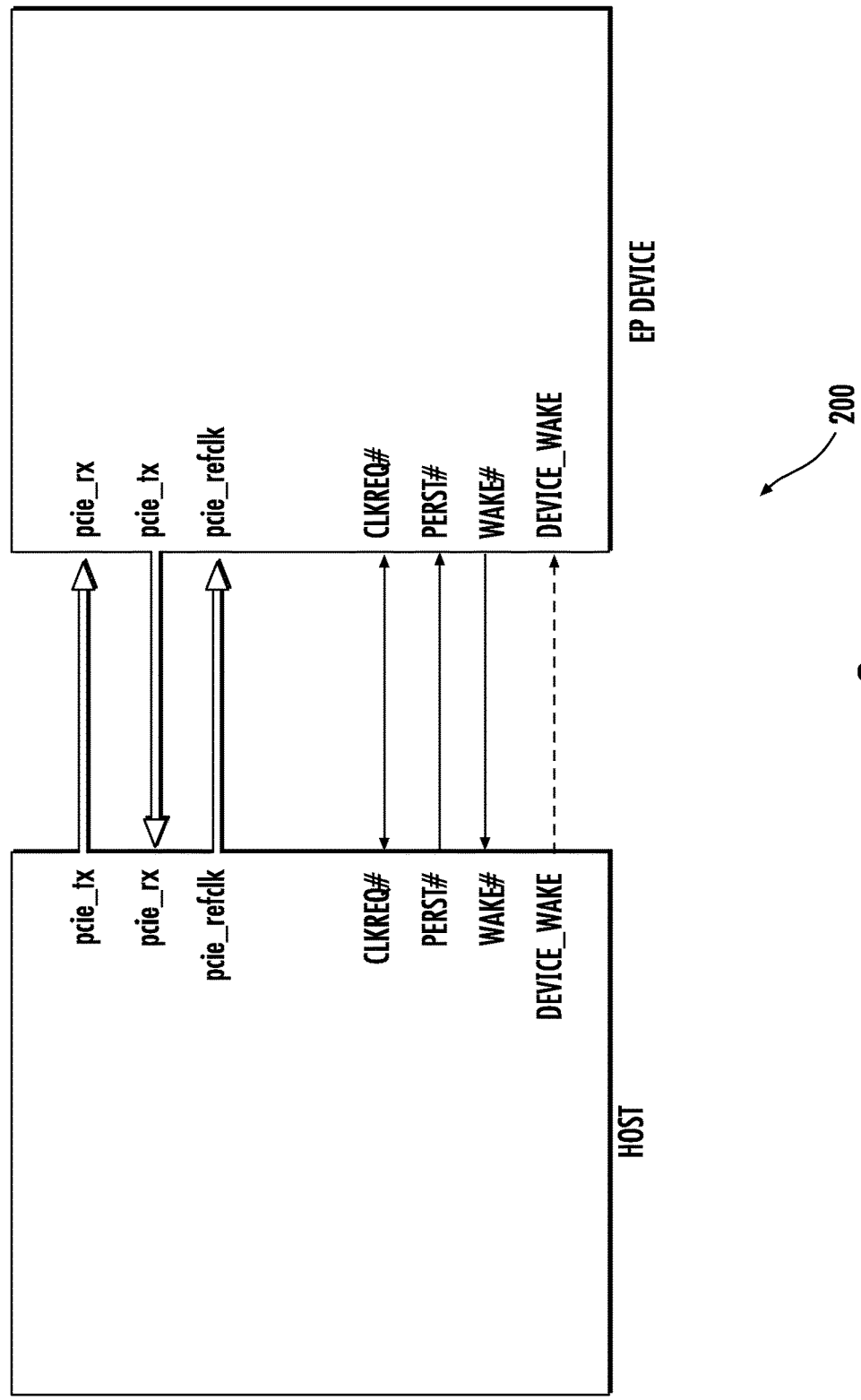
FIG. 2 is a logical block diagram of one exemplary physical bus interface useful in conjunction with the various principles described herein.

As shown in FIG. 2, the physical bus interface 104 is loosely based on the Peripheral Component Interconnect Express (PCIe) standard (e.g., as is described in "PCI Express Base Specification Revision 3.0" published Nov. 10, 2010, and "ECN L1 PM Substates with CLKREQ" approved Aug. 23, 2012, incorporated by reference herein in their entireties). Those of ordinary skill in the related arts, given the contents of the present disclosure, will readily appreciate that other bus interface standards may be substituted with equal success. Various modifications to the underlying physical bus interface 104 (and protocols used therewith) to support IPC functionality is described in greater detail hereinafter.

In the exemplary embodiment, the physical bus interface 104 is a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (pcie_rx, pci_tx). Each lane is a full-duplex byte stream, transporting data packets in eight-bit 'byte':formats, between the RC and EP of a link, in both directions simultaneously. The physical bus interface 104 can support multiple logical links (or virtual bus interfaces) representing multiple ongoing data sessions.

In one such embodiment, each virtual bus interface further includes one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Exemplary Boot Sequencing

Figure 3:
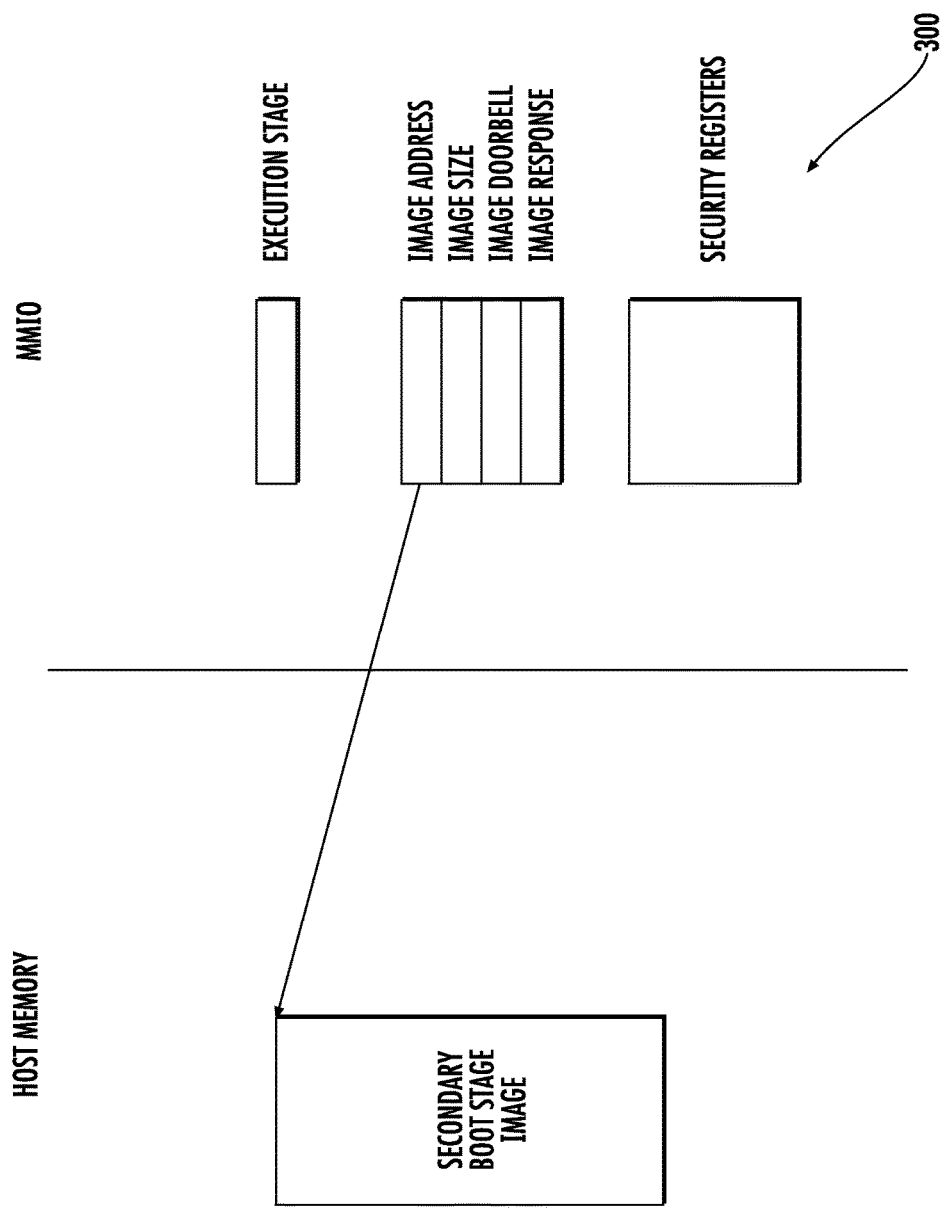
FIG. 3 is a logical representation of a shared memory interface configured to enable host assisted boot sequencing, in accordance with one implementation of the present disclosure.

In one aspect, the computer readable instructions, when executed by at least one of the first or second processors (102A, 102B) is configured to enable host assisted boot sequencing. FIG. 3 describes an exemplary embodiment where the peripheral processor does not have a complete boot image stored in e.g., Flash memory (i.e., operates as a "flashless" EP device); accordingly, the host processor must initialize the peripheral processor to the next (secondary) boot stage image and switch the peripheral processor execution to the next boot stage image. In typical implementations, the next boot stage image can be entirely mapped within contiguous memory; the host processor can provide the base address and size of the image over the memory mapped input/output (MMIO) of the EP device (which, as described hereinafter, resides virtually within shared memory space). Thereafter, the EP device receives the next boot stage image. In one such variant, the next boot stage image is provided over the IPC link. In some cases, the peripheral processor additionally reports a success or failure status to the host processor before switching to run time operation.

In one exemplary embodiment, the peripheral processor also updates the current execution stage in the MMIO space (which exposes the peripheral processors current execution stage to the host processor), thereby enabling simultaneous access during boot operations (and other operations e.g., run-time, etc.). In some variants, the EP device can expose security-related information over MMIO during boot sequencing.

Figure 4:
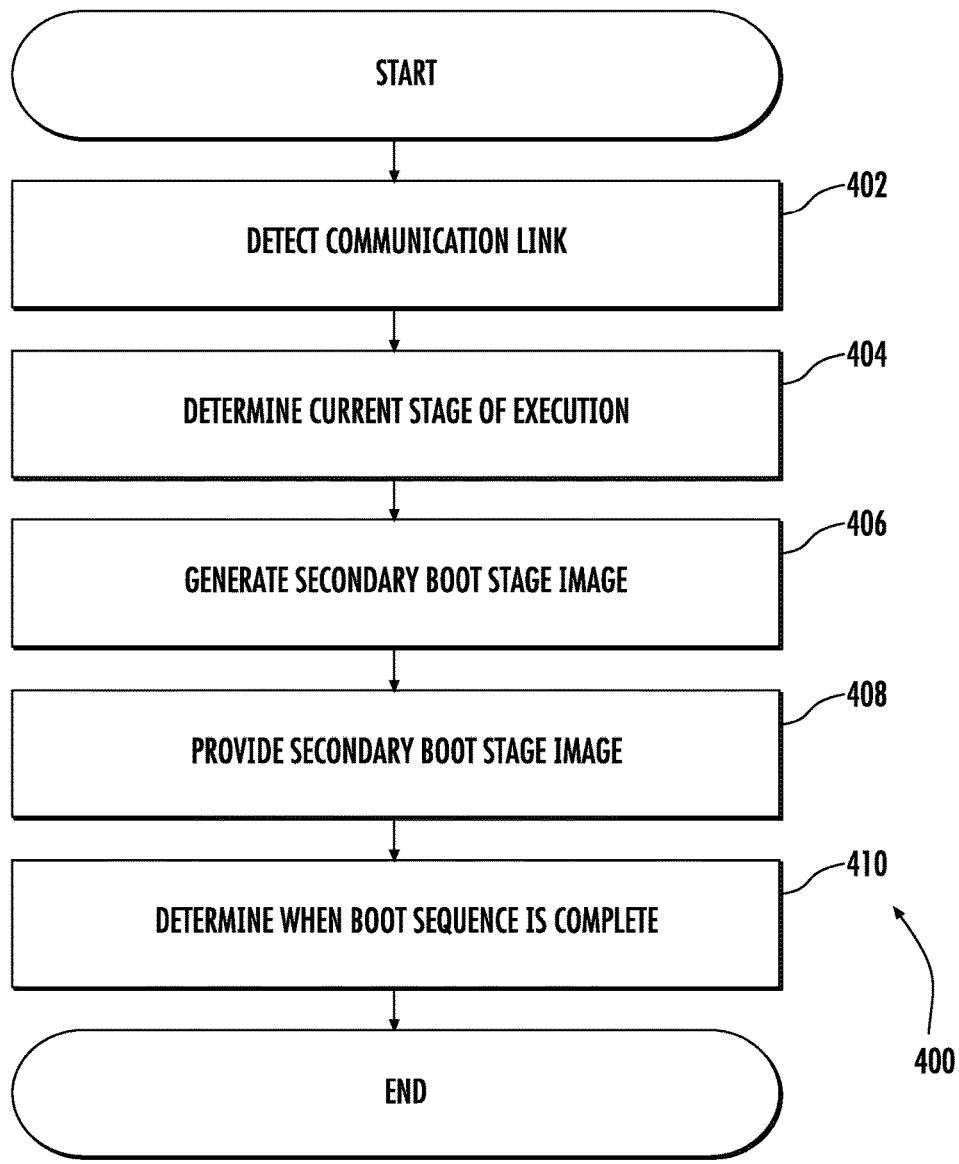
FIG. 4 is a generalized logical flow diagram illustrating an exemplary boot process for a host processor, in accordance with one implementation of the present disclosure.

The following discussion of FIG. 4 details one exemplary boot process 400 for the host processor.

At step 402, a communication link is detected by the host processor, and the peripheral processor is enumerated. In one exemplary implementation, the communication link is an IPC link that is loosely based on PCIe (such as is illustrated within FIG. 2, described supra), the host processor includes a Root Complex (RC) and the peripheral processor includes an Endpoint (EP). In one such variant, the enumeration process includes an initial query of the devices connected to the host processor (e.g., the aforementioned peripheral processor) and an assignment of each connected device to address.

At step 404, the communications link driver on the host processor determines the peripheral processor's current stage of execution. In one exemplary embodiment, the host processor reads a register within a shared memory interface (e.g., a mapped input/output (MMIO)) to determine the execution stage.

At step 406, when the host processor determines that the peripheral processor is in a primary boot sequence (e.g., executed from a boot read only memory (ROM) local to the peripheral processor), then the host processor loads an appropriate driver and generates/retrieves an appropriate secondary boot stage image therewith.

At step 408, the host processor provides the secondary boot stage image to the peripheral processor. In one exemplary embodiment, the host processor maps the secondary boot stage image to the shared memory interface (e.g., MMIO). In some variants, the secondary boot stage image has been optimized as a single contiguous image to optimize processing. However, those of ordinary skill in the related arts will readily appreciate (given the contents of the present disclosure), that excessive ranges of contiguous portions of memory may not be ideal for other reasons e.g., for memory management. Additionally, the secondary boot stage image may be limited in size (i.e., may not exceed a maximum size) so as to comply with communication link requirements.

In some embodiments, the provisioning of the secondary boot stage image includes writing a base address and size of the secondary boot stage image (or memory buffer containing it) to the appropriate image address and image size registers of the shared memory interface. Thereafter, the host processor can notify the peripheral processor of the secondary boot stage image by e.g., writing to an image "doorbell" register of the MMIO to instruct the peripheral processor to start processing the image. Responsive to the doorbell, the peripheral processor will retrieve the image. When the peripheral processor has read and processed the image, the peripheral processor will notify the host by sending an interrupt. In one embodiment, the notification is a message signaled interrupt (MSI or MSI vector) (a PCIe-based mechanism that allows the EP device to send an interrupt to the host). In some cases, the notification may have a dedicated mechanism (e.g., a designated vector number).

As used herein, a "doorbell" signal refers to any signal, register, or interrupt that is used by the host to indicate to the peripheral that there is some work to be done (e.g., data processing, control flow, etc.). Analogously, as used herein, the MSI is used by the peripheral to notify the host of work to be done. For example, in one exemplary implementation, one processor (e.g., the host) will place data in a shared memory location(s), and "ring the doorbell" by writing to a designated memory location (the "doorbell region"); responsively, the peripheral processor can process the data. Accordingly, at step 410, when the host processor receives the notification, the host processor reads the image response register to determine whether the boot sequence has completed. Upon successful completion (or alternatively, when the next execution stage is started), the host loads a run time communication link driver.

Figure 5:
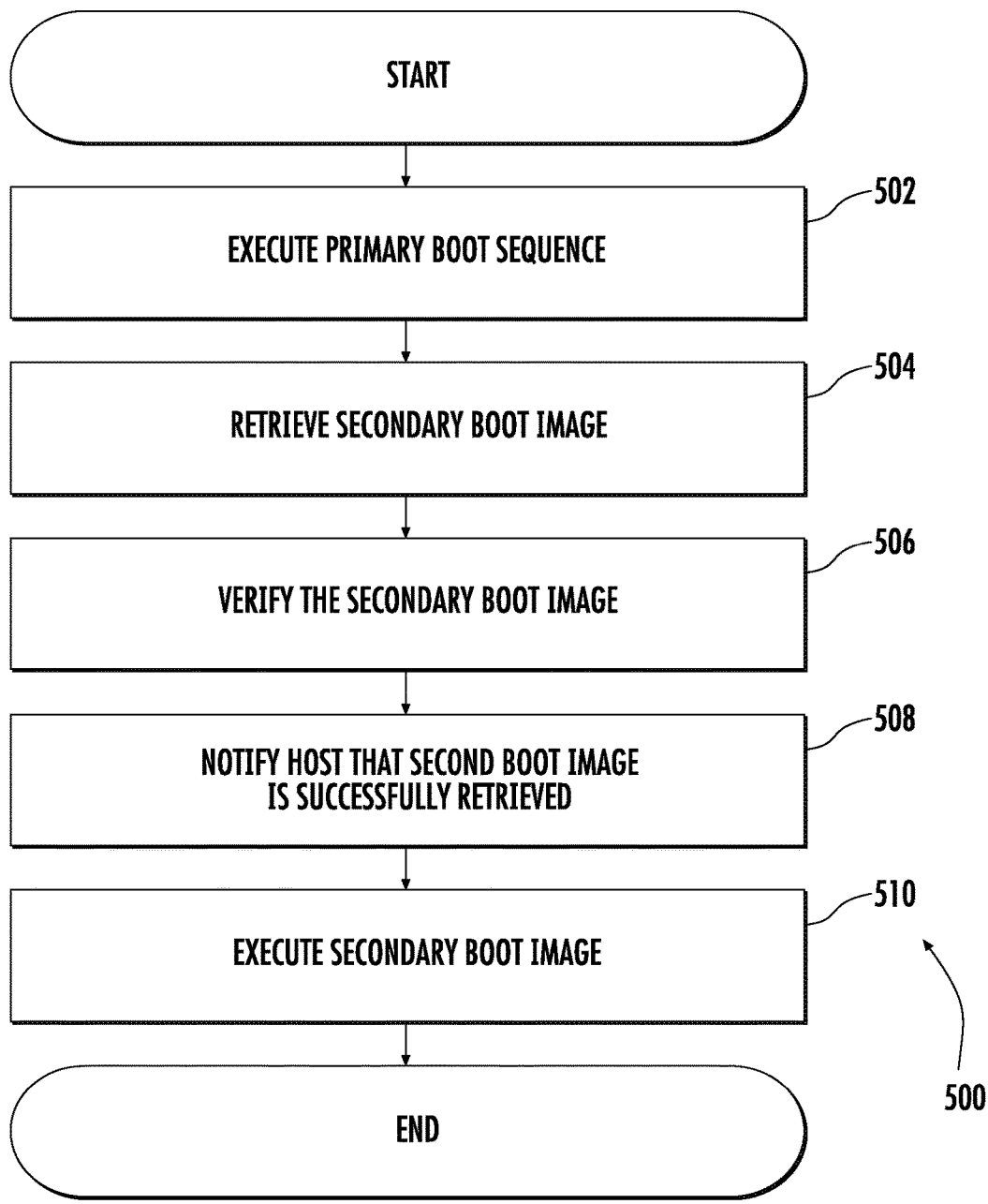
FIG. 5 is a generalized logical flow diagram illustrating an exemplary boot process for a peripheral processor, in accordance with one implementation of the present disclosure.

The following discussion of FIG. 5 details one exemplary boot process 500 for the peripheral processor.

In one embodiment, the execution stage register of the shared memory interface for the peripheral processor is set to default to boot from its local memory (e.g., boot ROM mode). Those of ordinary skill in the related arts, given the contents of the present disclosure, will appreciate other applicable boot schemes suitable herewith.

At step 502, the peripheral processor executes an initial primary boot sequence which may include e.g., a Link Training and Status State Machine (LTSSM) (such as the type described within the PCIe specification, previously incorporated by reference supra) and enumerating the peripheral processor to a communication link of a host processor.

At step 504, thereafter, responsive to receiving a notification from the host processor, the peripheral processor retrieves one or more secondary boot images. In one exemplary embodiment, the notification is an image doorbell register of the MMIO that signifies that the secondary boot image is available. Responsive to the doorbell, the peripheral processor will retrieve the image based on e.g., image address and image size registers of the shared memory interface. In one exemplary embodiment, the retrieval comprises a direct memory access (DMA) of the shared memory interface, which is executed via the communication link.

Those of ordinary skill in the related arts will recognize that any number of secondary boot stage images may be used (including subsequent tertiary, quaternary, etc. stages) to support varying levels of boot sequence complexity. For example, a first secondary boot stage and a second secondary boot stage may be executed from the primary boot stage; and subsequently, one of the secondary boot stages may additionally incorporate subsequent tertiary boot stages, etc.

At step 506, the peripheral processor may first verify, or validate the image to ensure that the image is e.g., secure, and not corrupted. Common examples of validation include e.g., certificate authentication, cyclic redundancy checks (CRC), parity checks, etc.

When the peripheral processor successfully retrieves the secondary boot stage image, the peripheral processor sets the image response register and sends a notification to the host processor (step 508) (within the MMIO or the shared host memory). Thereafter, the peripheral processor executes the secondary boot stage image (step 510). Otherwise, if the peripheral processor fails to retrieve the secondary boot stage image (or if an invalid condition is met e.g., corrupt boot image, etc.), then the peripheral processor triggers a fatal error condition.

In the event of a fatal error condition, the host processor will perform error recovery procedures. In some variants, the host processor will responsively reset the peripheral processor. In other variants, the host processor will abort the peripheral processor boot. Various other error recovery schemes are described in greater detail hereinafter.

Exemplary Run Time Processing

Figure 6:
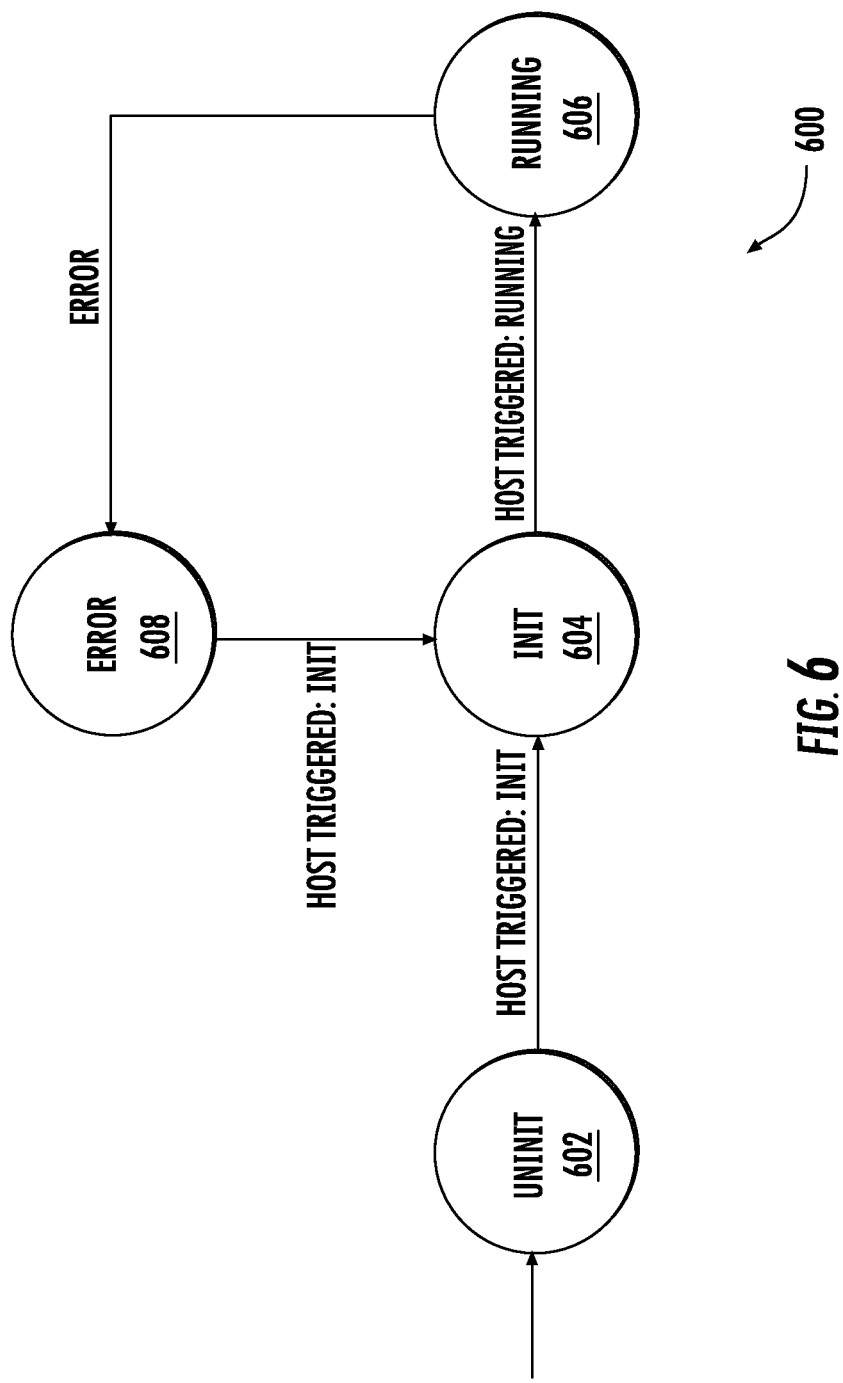
FIG. 6 is a logical block diagram of an exemplary run time operation state machine useful in conjunction with the various described embodiments.

In one aspect, the computer readable instructions, when executed by at least one of the first or second processors (102A, 102B) is configured to transact data via a run time processing protocol that is based on a shared memory architecture. FIG. 6 illustrates one exemplary embodiment of a Run Time IPC State Machine 600. In the exemplary embodiment, the first and second processor share a shared memory interface that includes a memory mapped input/output (MMIO) space.

In one embodiment, the state machine comprises four (4) states; in one exemplary variant, the four (4) states are controlled by two registers in the MMIO: IPC Status, and IPC Control. IPC Status is read-only for the host processor and read/write for the peripheral processor and reflects the peripheral processor's IPC state machine. IPC Control is write-only for the host and read-only for the peripheral processor. IPC Control allows the host processor to trigger IPC state machine transitions. Writing to IPC Control triggers an interrupt for the peripheral processor.

In the exemplary embodiment of FIG. 6, the Run Time IPC State Machine starts in the UnInit State 602 (e.g., a default state from reset, power-down, power-off, etc.) When the host processor writes an initialize command to the IPC Control register, the state machine changes to the Init State 604. Responsively, the peripheral processor sets up and initializes its local data structures, and updates the IPC Status register to signal that the Init State 604 has completed. In some embodiments, the peripheral processor may additionally notify the host processor (e.g., with a message signaled interrupt (MSI) i.e., a PCIe-based mechanism that allows the peripheral processor to send an interrupt to the host processor). Concurrently, the host processor can initialize its own data structures; when the host processor receives the notification, it checks the IPC Status register to detect the completed change to Init State 604.

From the Init State 604, the host processor updates the shared memory interface (e.g., the MMIO register Context Information Address) and triggers the transition to the Running State 606 by writing a run command to the IPC Control register. Responsively, the peripheral processor reads the Context Information and updates the IPC Status register to Running.

As described in greater detail hereinafter, in the Running state 606, data transfers can take place between the host and the peripheral processor; however, in the event of an error condition on either the host or the peripheral processor, the IPC state machine transitions to the Error State 608. The host informs the peripheral processor of an error by writing an error flag to the IPC Control register. In contrast, the peripheral processor informs the host processor of an error (internal or host initiated), by updating the IPC Status register to Error.

From the Error state 608, the peripheral processor clears its current Context Information Address and terminates further host memory access. In some cases, the peripheral processor may store a mirror copy of a few critical peripheral processor registers i.e. Execution Stage Mirror and IPC Status Mirror, in the host memory (in a location specified for device information). Once the peripheral processor has the device information address, it updates the mirror copy of these registers in host memory each time the local register changes, followed by a MSI. The IPC Status Mirror is updated by the peripheral processor as part of the Running and Error States (606, 608).

Referring back to the Running State 606 of FIG. 6, in one exemplary embodiment, data transfers are performed as a series of data transactions over unidirectional "pipes". A pair of pipes creates a bi-directional interface. While the following discussion is provided within the context of a "full-duplex" scheme, those of ordinary skill in the related arts will readily appreciate that the described protocols may be substituted with equal success with so-called "half duplex" schemes, given the contents of the present disclosure.

In one exemplary embodiment, a client service (e.g., control, data, trace, etc. associated with a data session) is associated with a single interface i.e. a pair of pipes. Each client service input/output (I/O) may be composed of multiple so-called "transfer descriptors" (TD). For example, a single TD may describe a physically contiguous memory buffer, accessible by the host/peripheral processor over the communication link.

Each pipe (i.e., data stream) is associated with one "transfer descriptor ring" (TDR). The TDR data structure resides in host processor memory and is accessible by the peripheral processor. Each TDR is described by a head pointer and a tail pointer, and encompasses one or more TD; each TD includes: an address of a buffer in host memory, a size of the buffer, a next count that indicates the number of TDs remaining in an I/O transfer, and a completion status. The head pointer points to the next empty slot in the TDR, whereas the tail pointer points to the address of next TD which the peripheral will process. The head pointer is written by the host and read by the peripheral. The tail pointer is read by the host and written by the peripheral. All TDs and associated data buffers between the tail pointer and the head pointer are associated with the peripheral processor. When the head pointer is equal to the tail pointer, the TDR is empty.

The peripheral processor provides an array of so-called "doorbell" registers, and a so-called "head pointer doorbell array" (HPDA) which is further indexed by pipe number. The host processor notifies the peripheral processor of a new TD in a TDR by writing the head pointer value in the doorbell register at a pipe number offset inside the HPDA. Similarly, the host provides a so-called "tail pointer array" (TPA) in host memory that is indexed by pipe number, which is updated by the peripheral processors with tail pointer values to indicate completion of a TD.

Figure 7:
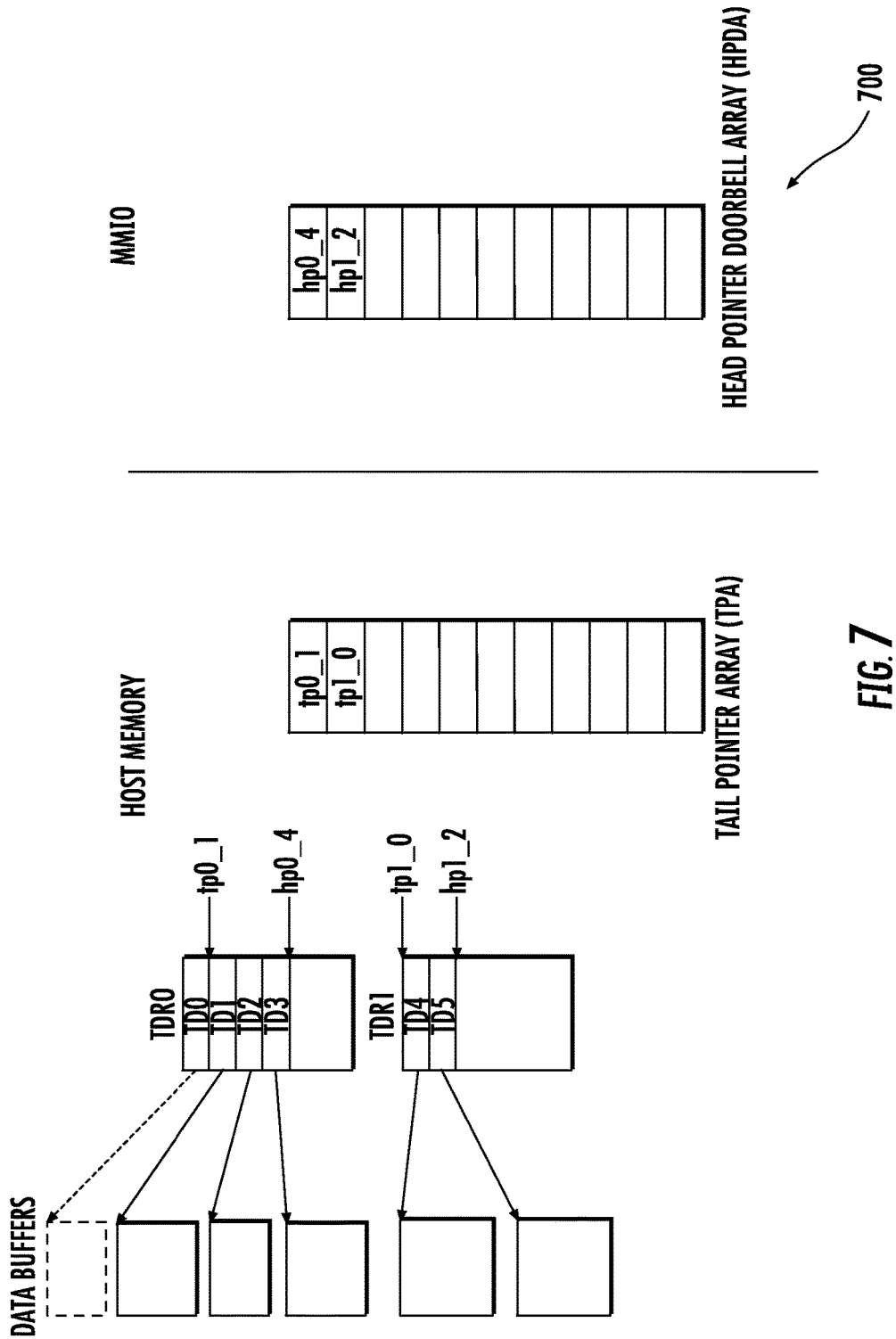
FIG. 7 is a logical representation of one exemplary dual pipe data structure comprising two (2) transfer descriptor ring (TDR) data structures each of which comprises a number of transfer descriptors (TDs), useful in conjunction with the various described embodiments.

FIG. 7 illustrates one exemplary data structure 700 described supra. The data structure 700 includes a first pipe (TDR0) in the uplink direction (from the host to the peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the HPDA (0). After the peripheral processor has successfully transmitted the data for TD0, it updates the TPA entry (0) by writing a new tail pointer address (tp0_1). When the peripheral processor updates the appropriate TPA entry, the host can free the corresponding data buffer from memory.

Similarly, as shown, the host has queued two (2) TDs in TDR1 for downlink transfer and informs the peripheral process device by writing hp1_2 at offset 1 in HPDA. Once the peripheral processor consumes these TDs, it will update TPA to inform the host.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

Figure 7A:
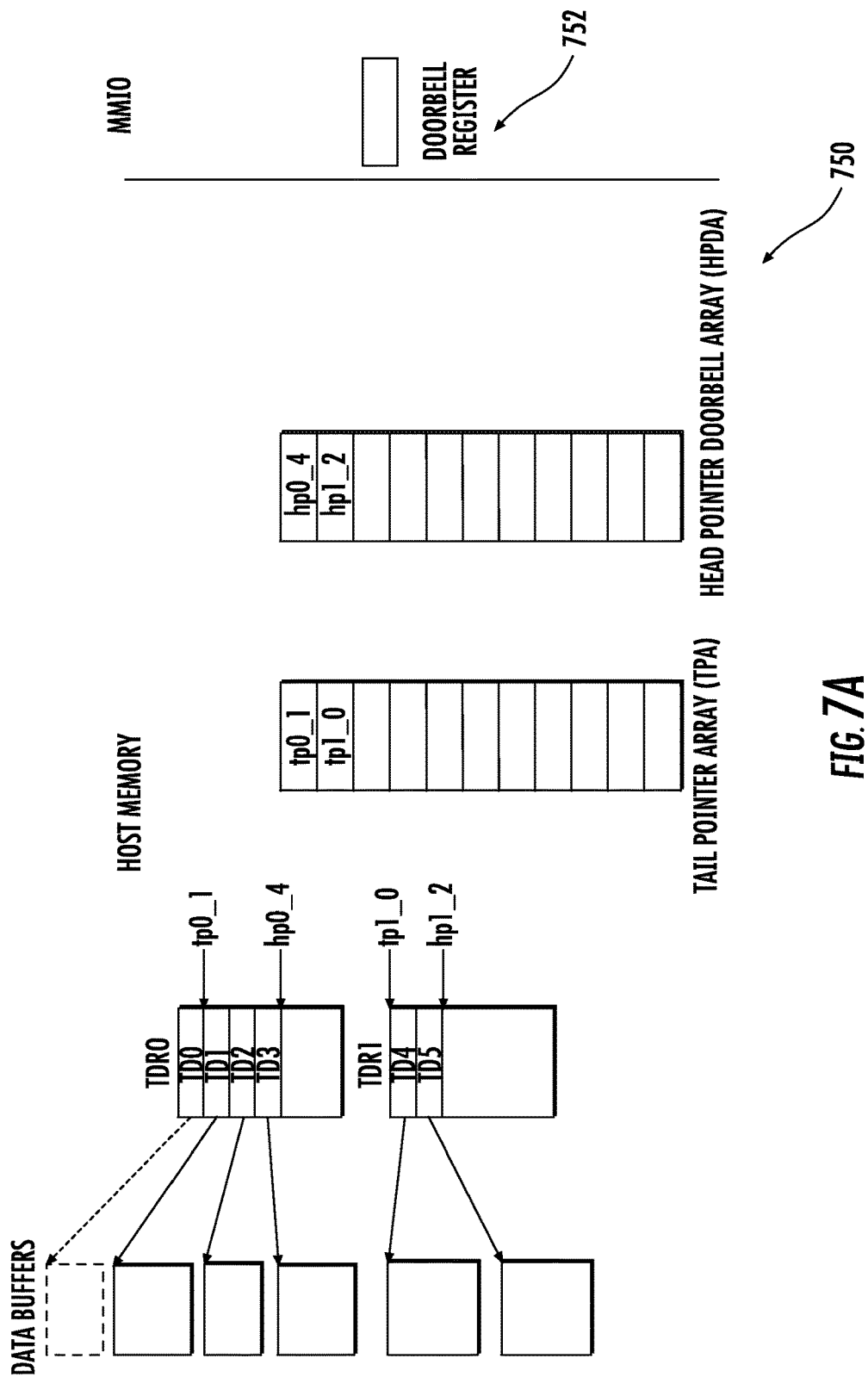
FIG. 7A is a logical representation of an alternate exemplary dual pipe data structure comprising two (2) transfer descriptor ring (TDR) data structures each of which comprises a number of transfer descriptors (TDs), useful in conjunction with the various described embodiments.

FIG. 7A illustrates an alternate exemplary data structure 750 described supra (here, with a "doorbell register" 752 disposed in the MMIO, and the doorbell array disposed in the host processor (e.g., AP).

Figure 8:
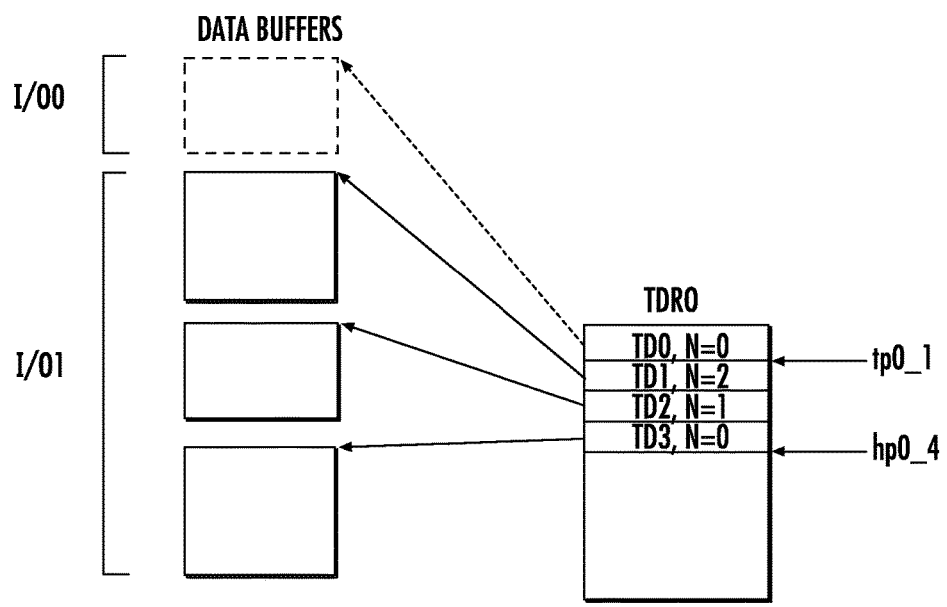
FIG. 8 is a logical representation of one exemplary scatter-gather input/output (I/O) transfer, useful in conjunction with various described embodiments.

FIG. 8 illustrates one exemplary scatter-gather TD 800 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 1 (one (1) TD remains N=1), and TD3 points to TD0 which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TDRs, the size field is read-only for the peripheral, whereas for downlink TDRs the size field may be read/write for the peripheral. During a downlink transfer, the peripheral reads the size field to determine the maximum size of the buffer available. After the downlink transfer, the peripheral may update the size field with the actual size of data written into the buffer.

Figure 8A:
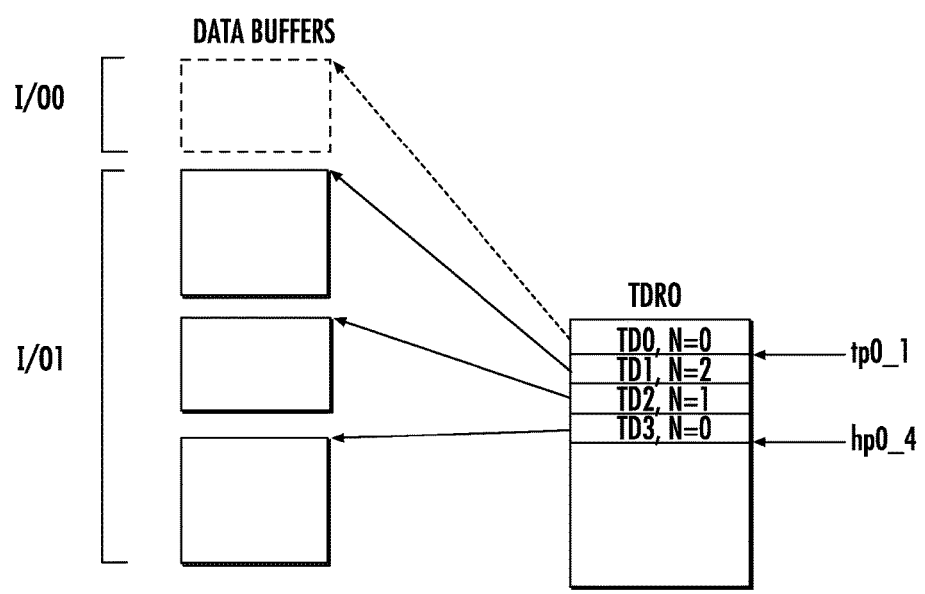
FIG. 8A is a logical representation of an alternate exemplary scatter-gather input/output (I/O) transfer, useful in conjunction with various described embodiments.

FIG. 8A illustrates an alternate exemplary scatter-gather TD 850, which is described by three (3) TDs according to an exemplary "scatter-gather" scheme, and which is useful with the data structure 750 of FIG. 7A.

Figure 9:
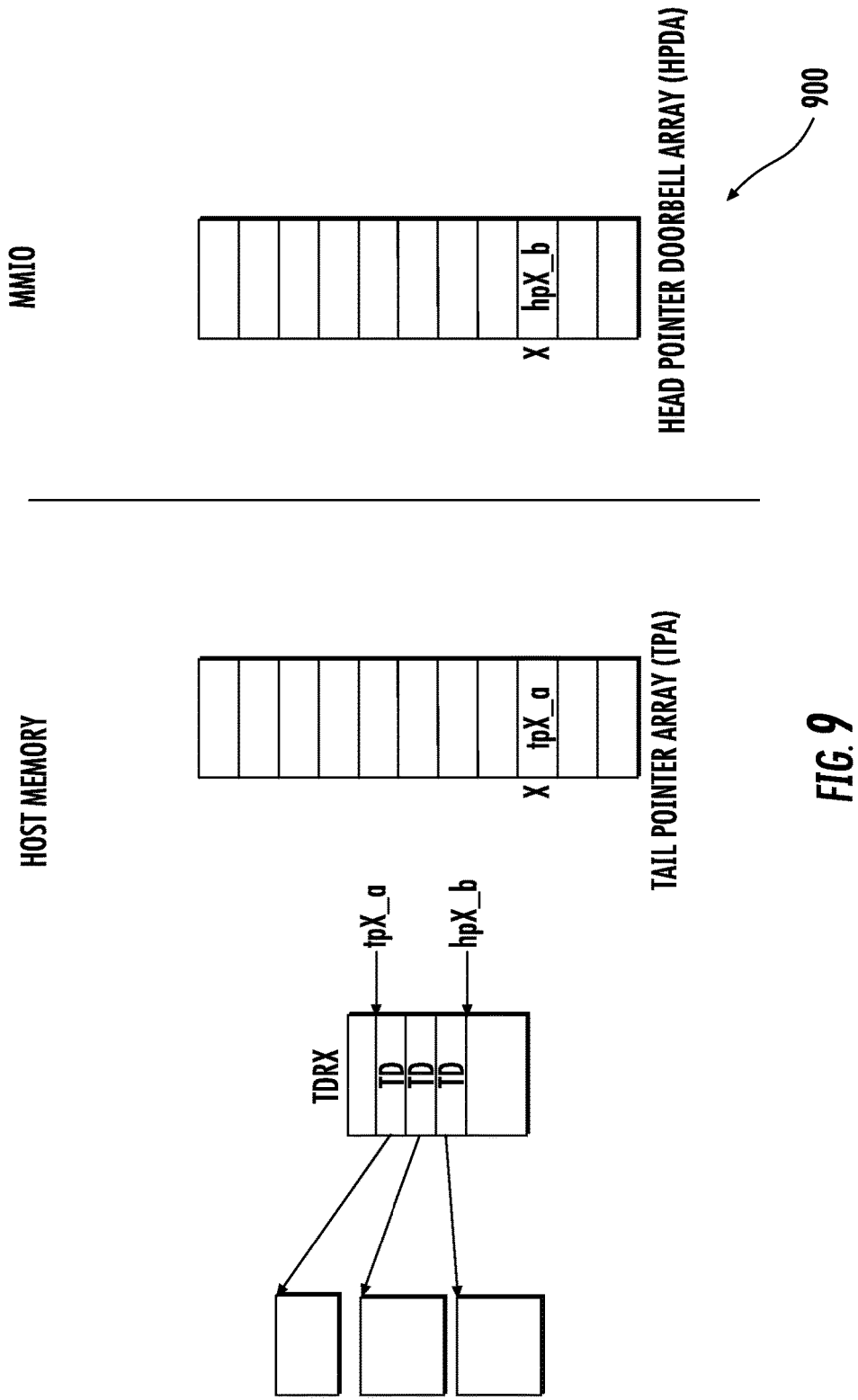
FIGS. 9-11 are logical representations of one exemplary transfer descriptor ring (TDR) at various stages of processing, in accordance with the principles described herein.
Figure 9A:
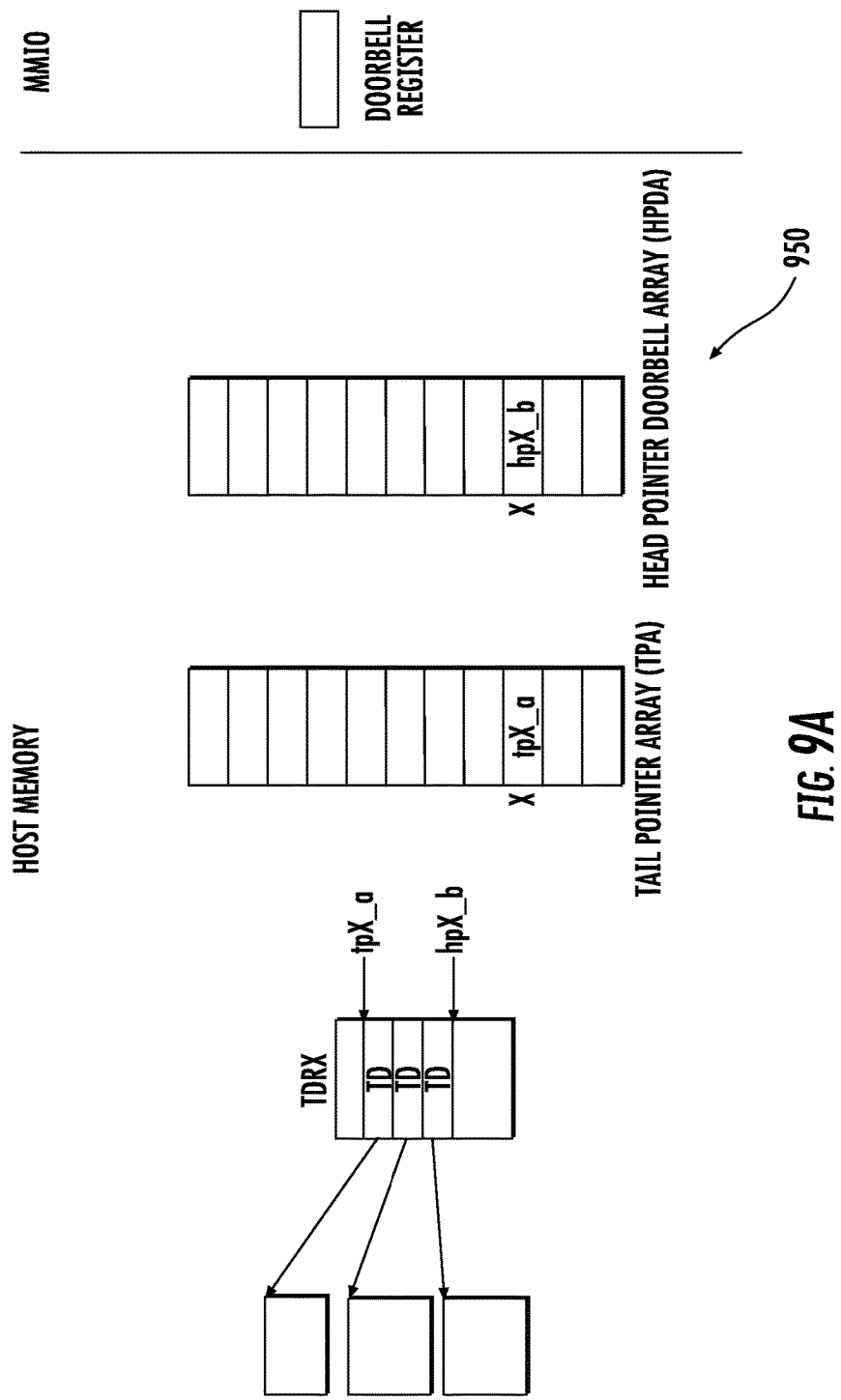
Figure 10:
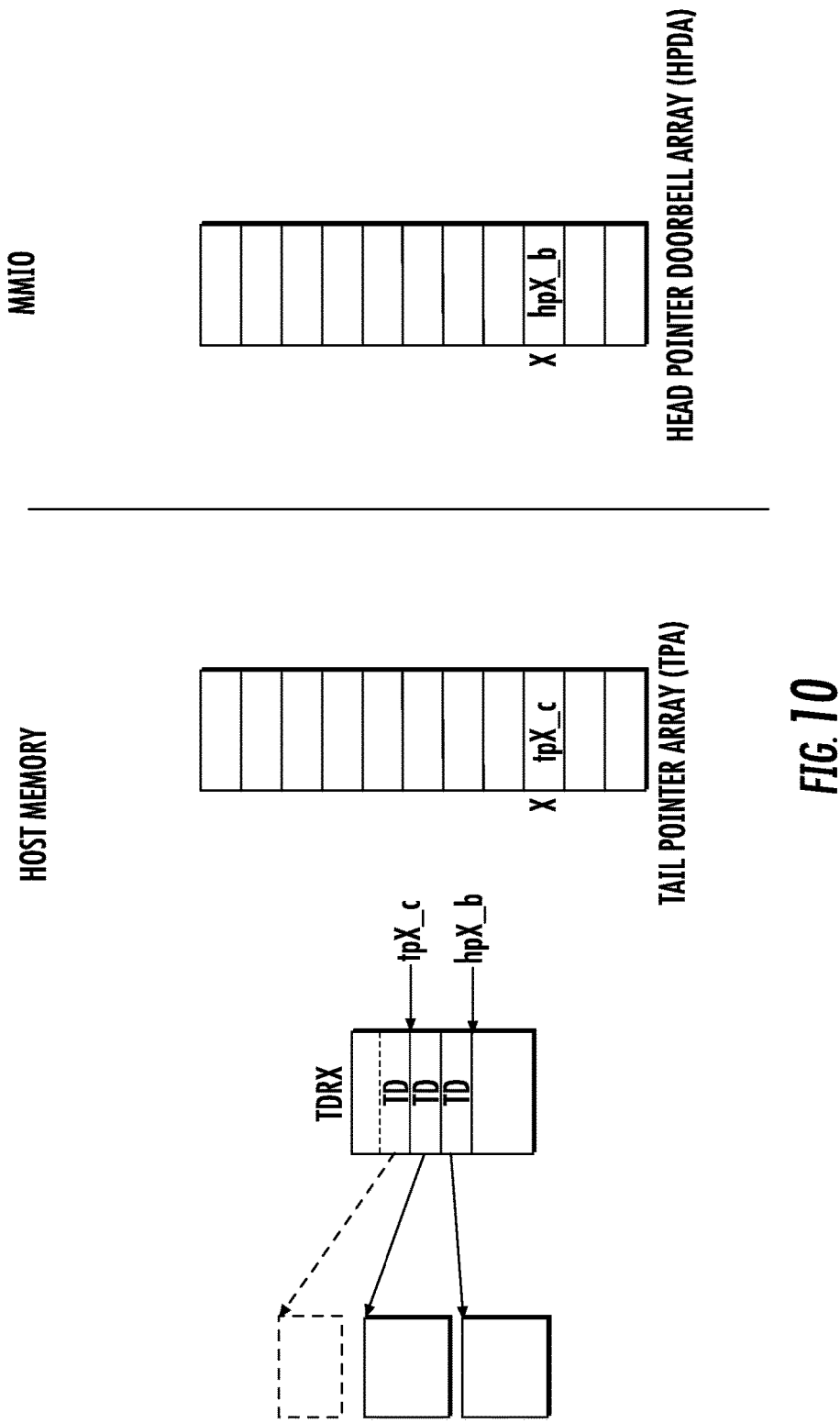
Figure 10A:
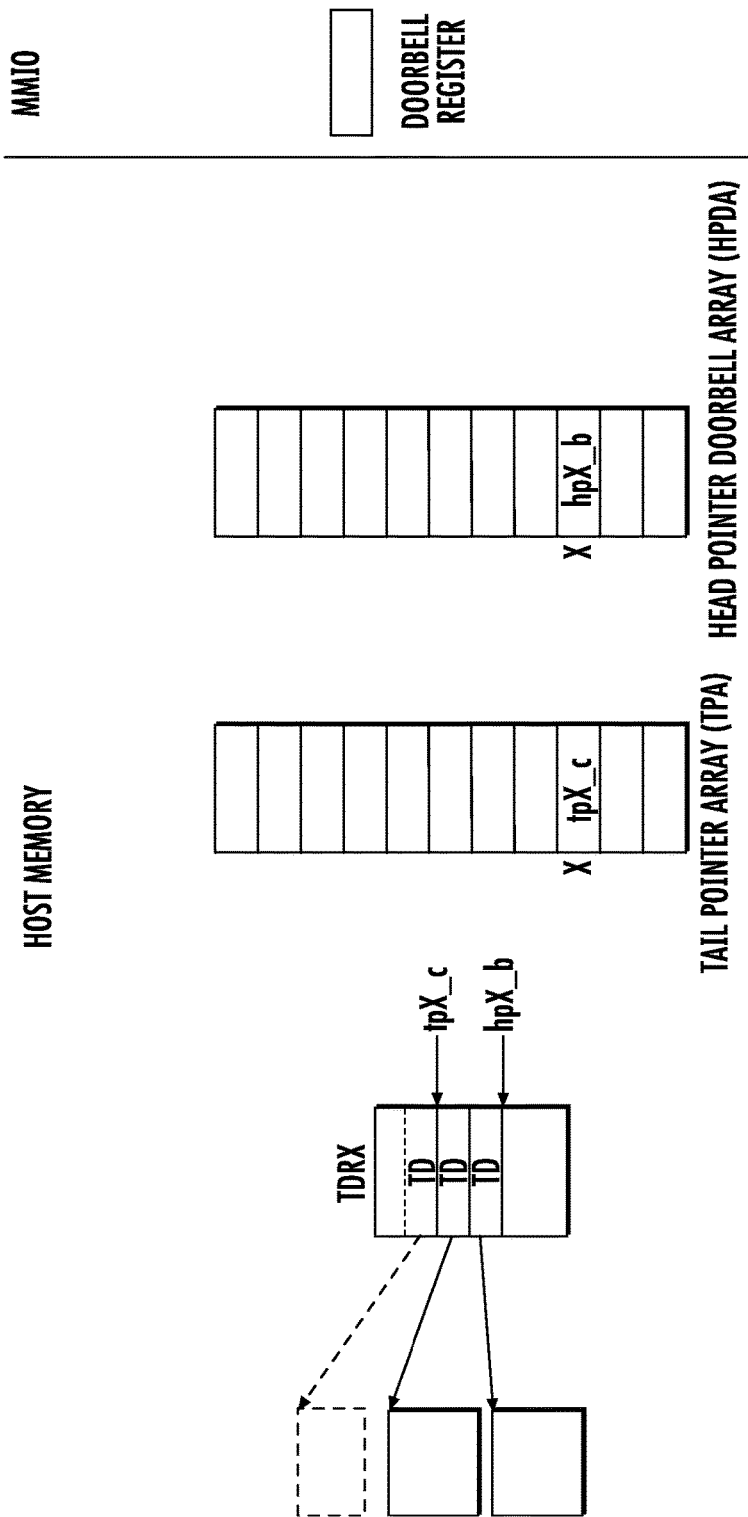
Figure 11:
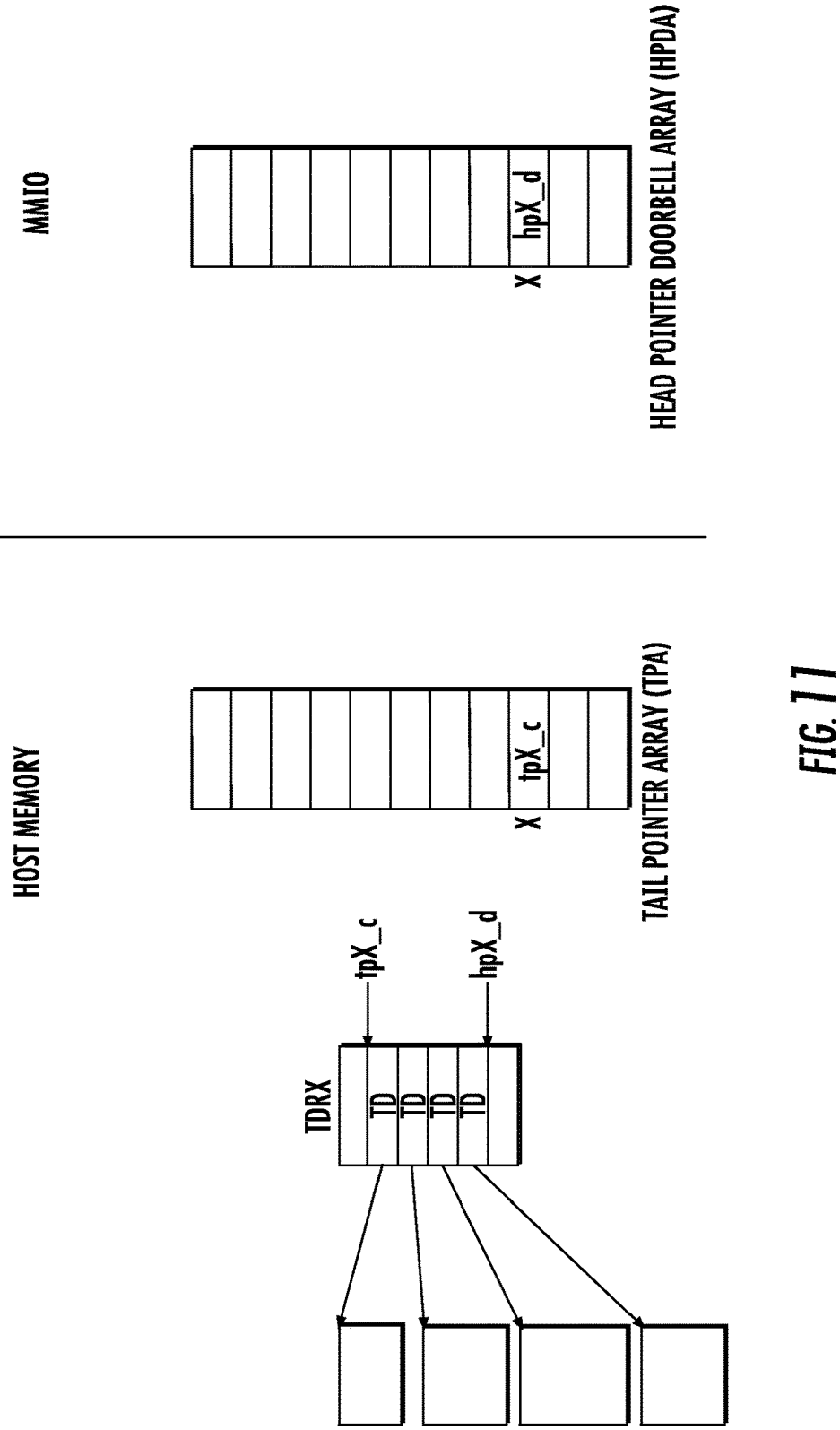
Figure 11A:
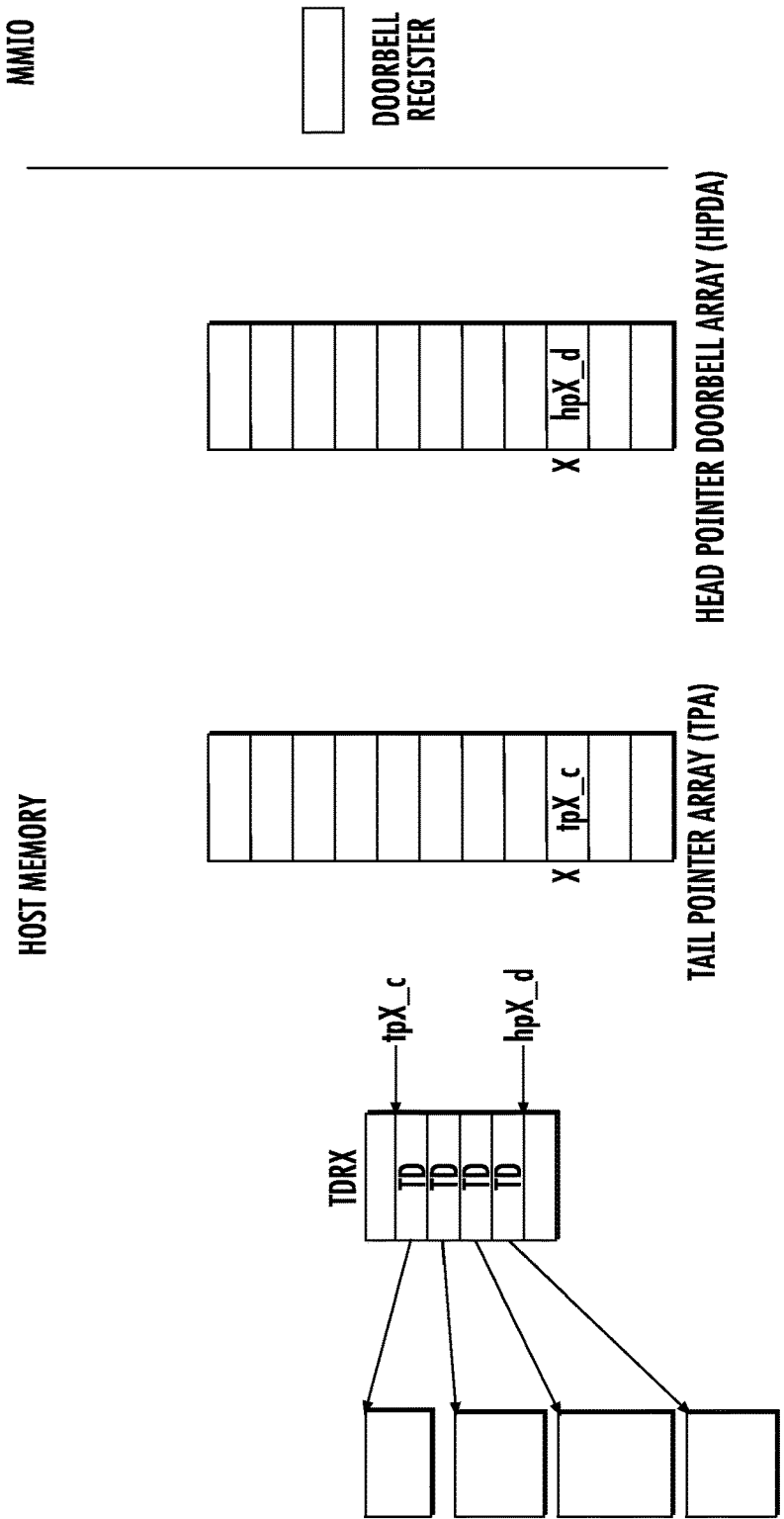

FIGS. 9-11 illustrate exemplary TDR (TDRX) transactions which support a "pipe" (pipeX, where X is the pipe number). As shown in FIG. 9, the TDR can contain multiple TDs, and the TDR state is described by the values of head pointer and tail pointer. The head pointer (hpX_b) points to the next empty slot in TDRX, and the tail pointer (tpX_a) points to the current location in TDRX (i.e., the location the peripheral will process next). As previously noted, when the head pointer equals the tail pointer, the ring is empty. Any TD between the tail pointer and head pointer is controlled by the peripheral processor; while the following scheme is based on a mutually exclusive control (i.e., when the host controls a memory, the peripheral cannot write to the memory and vice versa), those of ordinary skill in the related arts, given the contents of the present disclosure, will readily appreciate that other forms of shared access may be substituted with equal success. As previously noted, the head and tail pointers can be exchanged between host and peripheral processors via the TPA and HPDA data structures of the MMIO.

FIG. 10 depicts the exemplary TDR after the peripheral processor has completed processing a TD. Specifically, as shown, once the peripheral processor has completed a TD, it updates the TD and the TPA with the address of the next TD to be processed, followed by a generation of an MSI. Responsive to the MSI, the host processor frees the TD and indicates successful completion to the client service.

FIG. 11 depicts the exemplary TDR queuing additional TDs for subsequent processing. As shown, when the host processor queues a new buffer, it checks whether there is an entry available in the TDR. Where there is an entry, the host processor populates the TD at the address pointed to by the head pointer, and then the head pointer value is updated. Thereafter the host processor updates the HPDA with the new head pointer value, which notifies the peripheral processor of the change.

FIGS. 9A-11A illustrate exemplary TDR (TDRX) transactions in the context of the architecture of FIG. 7A (i.e., doorbell register in MMIO) discussed above.

Figure 12:
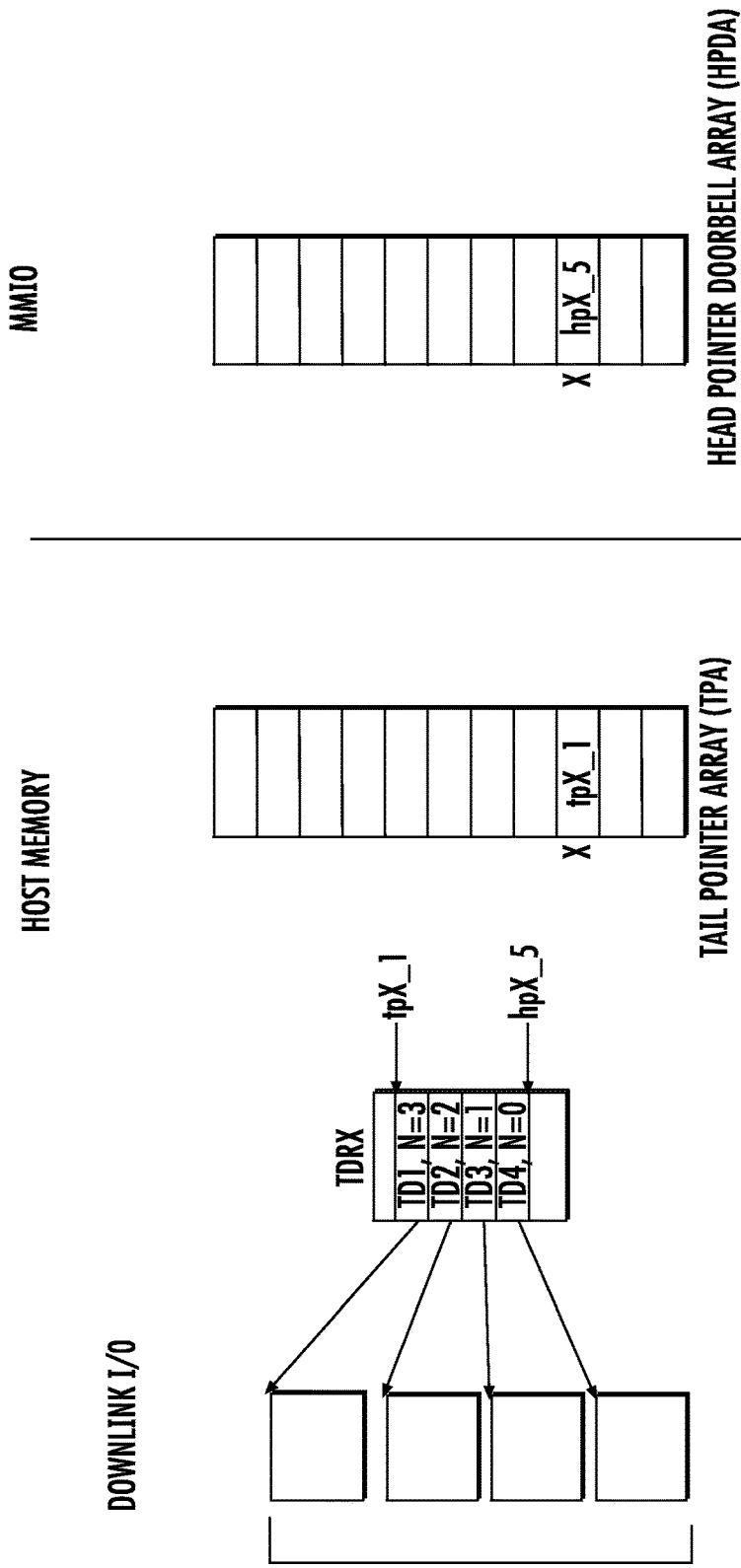
FIGS. 12-13 are logical representations of one exemplary transfer descriptor ring (TD) illustrating over-buffering and termination prior to completion, in accordance with the principles described herein.
Figure 13:
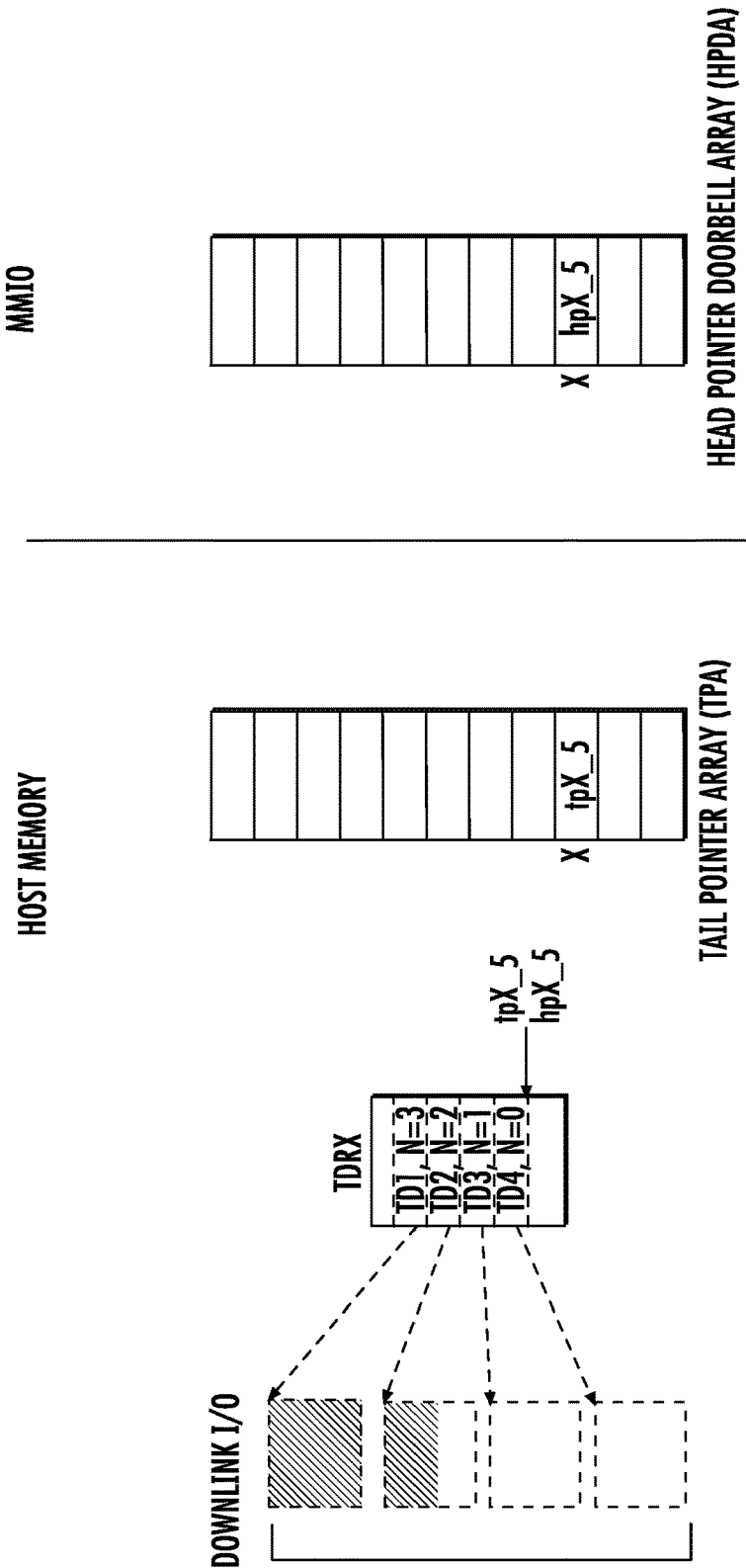

Referring now to FIGS. 12 and 13, there may be special considerations for downlink transfers.

As previously noted, in the exemplary embodiment, when a host processor queues a TD for a downlink transfer in a TDR, the size field indicates the expected size of the buffer queued. On completion, the peripheral processor overwrites this value with the actual number of bytes written in the buffer. In some cases, the host processor may not know in advance the amount of data which will be sent by the peripheral processor. In some designs, the host processor may queue a large buffer out of an abundance of caution (e.g., to prevent a buffer overrun). For such implementations, the host processor may additionally queue a number of such large buffers in memory. See FIG. 12.

In some cases, the I/O transfer may be terminated prior to completion (presumably consuming fewer of the TDs than were queued for the transfer). In these scenarios, the peripheral processor generates the end transfer completion for the TD irrespective of the Next count (ignoring the remaining buffers). In such cases, the host processor will reap all of the TDs from the TDR (including the extraneous TDs). See FIG. 13.

In the foregoing embodiments, the TDR is valid while the pipe is open. Pipes can be opened or closed based on appropriate messaging. For example, in one such implementation, an Open Message provides the address of the TDR and its size, whereas a Close Message completion may "reap" the TDR (e.g., enabling the data to be overwritten or allocated to other purposes, etc.). When a pipe is not open, its corresponding values within the TPA and HPDA are not relevant (or otherwise disregarded).

In one aspect, the host processor controls the state of the pipe via a messaging data structure. In one exemplary embodiment, the messaging data structure is queued according to a message ring (MR), which operates in a manner similar to the aforementioned TDR. Specifically, the MR is described by a message tail pointer (MTP), a message head pointer (MHP), and a message head pointer doorbell (MHPD). When initializing the IPC state machine, the processor configures the MR, and sets the MR base address in the MTP, and update context information which is configured to cause the peripheral processor to read the MR base address in the MHPD and transition the Run Time IPC State Machine of FIG. 6 to the Running State 606. Thereafter, the host can transact messages with the peripheral processor.

During run time operation, every time the host has a new message to send, it checks whether there is space in the MR for a message request. If so, a new message entry is created at the MHP and the head pointer value is updated. The new head pointer value is written to the MHPD. When the peripheral processor has consumed the message, it updates the status of the message and then updates the MTP. Additionally, the peripheral processor sends an MSI.

Various other modifications and/or permutations of the TD, TDR, and MR data structures and transactions may be made by one of ordinary skill, given the contents of the present disclosure.

Exemplary Power Management Scheme

As a brief aside, existing PCIe implementations support a so-called "standby" or "sleep" mode. However, existing PCIe sleep mode operation was designed for personal computer implementations which have sleep states that are less involved than techniques used in e.g., typical cellular phone devices, etc. Accordingly, existing PCIe specifications mandate an exit latency that is much shorter than the actual exit latency that most cellular devices can support (an unresponsive peripheral processor would cause the host fabric to hang). In view of the limitations of existing PCIe implementations, the disclosed IPC enabled host and peripheral processors independently track sleep mode operation so that the shared memory interface (MMIO) can be "gated off" during sleep mode operation until the sleeping processor wakes up.

In one embodiment, the computer readable instructions, when executed by at least one of the first or second processors (102A, 102B) is configured to perform power management. In one exemplary embodiment, power management between the two independent processors is configured according to a sleep message. One such sleep message contains: a target field that indicates which processor (e.g., host or peripheral) the message is directed to, a state field that triggers the appropriate processor state machine to enter or exit a sleep mode, a type field which identifies the message type, and a completion status field which indicates whether the sleep message is succeeded or failed.

In one exemplary embodiment, two (2) registers control the peripheral processor sleep state machine: Peripheral Sleep Notification (in the host memory) and Peripheral Sleep Control (in the peripheral processor memory). Peripheral Sleep Notification is written by the peripheral processor to indicate whether the device is active or sleeping. The peripheral processor notifies the host processor (via e.g., an MSI) after updating this register. Peripheral Sleep Control sits in the peripheral processor MMIO space and is updated by the host to indicate active mode, sleep mode, and wake mode. An interrupt is triggered when the host updates the Peripheral Sleep Control register.

In one exemplary embodiment, the peripheral initiates entry to sleep mode autonomously (without host assistance). In other embodiments, the peripheral may be gated by the host processor, or be otherwise conditionally limited as to initiating sleep mode operation. In one such case, the peripheral processor triggers sleep mode operation when: there is a very high probability that it will enter sleep, the sleep state machine is in the active mode, and the host has not asserted device wake. The peripheral processor may trigger wake operation when: the sleep state machine is in sleep mode, and the peripheral processor device requires the communications link for communication, or the host requires the peripheral processor to wake-up (indicated via a device wake assertion).

Figure 14:
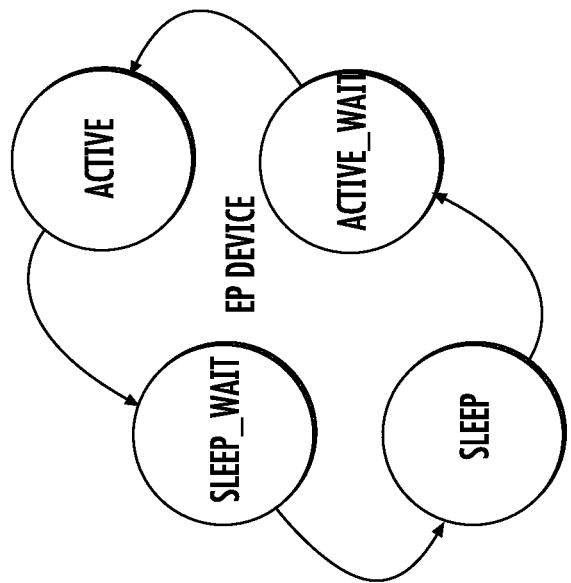
FIG. 14 is a logical block diagram of exemplary independent state machines within each processor which support a peripheral processor initiated sleep mode, useful in conjunction with the various described embodiments.
Figure 14:
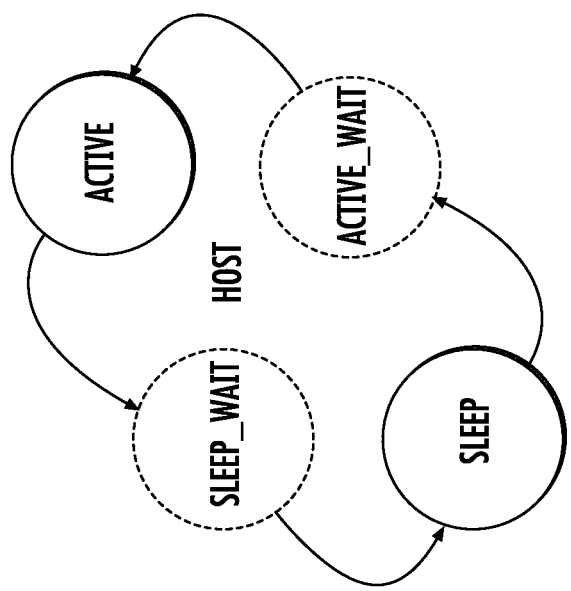

FIG. 14 illustrates the independent state machines within each processor which support a peripheral processor initiated sleep. In some embodiments, wake-up procedures can be initiated by using an out-of-band GPIO (which triggers wake) in other embodiments, wake-up procedures can be triggered via a dedicated in-band MMIO doorbell.

In order to go to sleep, the peripheral processor can send a sleep mode request in the Active State via the Peripheral Sleep Notification register, and enter the Sleep_Wait State. When in Sleep_Wait State, the peripheral processor is quiescent and does not initiate or complete any data transfers or messages. The peripheral processor monitors the Peripheral Sleep Control register for host action.

When the host detects the sleep mode request, the host processor updates the Peripheral Sleep Control register to Sleep Mode and enters the Sleep State. The peripheral processor detects the update in the Peripheral Sleep Control register and enters the Sleep State.

In the Sleep State, the peripheral processor checks whether the host processor has any pending transfers or messages in flight. If so, then the peripheral processor initiates the "wake-up" process to transition to the Active State. Similarly, if the peripheral processor needs to access the communication link, then it will wake-up.

In order to wake-up, the peripheral processor sends an Active Mode request via the Peripheral Sleep Notification register and enters the Active_Wait State. The peripheral processor can thereafter immediately access the communications link for data transfer and messages, however (in order to prevent a state machine race condition) the peripheral processor cannot enter sleep or send a Sleep Mode request.

Responsive to the Active Mode request, the host updates the Peripheral Sleep Control register to Active Mode and enters the Active State. The peripheral processor enters the Active State when it sees the host's update in the Peripheral Sleep Control register.

The host initiated sleep process is similar. When the host is ready to enter sleep, it informs the peripheral processor via a Host Enter Sleep Message. Upon seeing the Host Enter Sleep Message, the peripheral processor suspends its own sleep state machine, and processes all pending TDs.

Responsive to the Sleep Message completion, the host may transition to sleep mode; thereafter, the peripheral processor may also independently enter sleep mode. If the peripheral processor needs to reestablish communication with host, it can request the host to wake-up via e.g., an out-of-band GPIO (which triggers wake). Once the host has woken, the host updates the peripheral with a Host Exit Sleep Message.

Referring back to the peripheral processor, once the peripheral processor TDR processing is complete, the peripheral processor transmits a complete/acknowledge response to the Sleep Message. Thereafter the peripheral processor will not accept any more TDRs until it receives a Host Exit Sleep Message from the host processor (received via a Message Ring (MR)). The peripheral will acknowledge/complete the Host Exit Sleep Message before resuming data transfers.

Exemplary Error Recovery

In one embodiment, the computer readable instructions, when executed by at least one of the first or second processors (102A, 102B) is configured to handle and/or recover when the other processor experiences an error.

Figure 15:
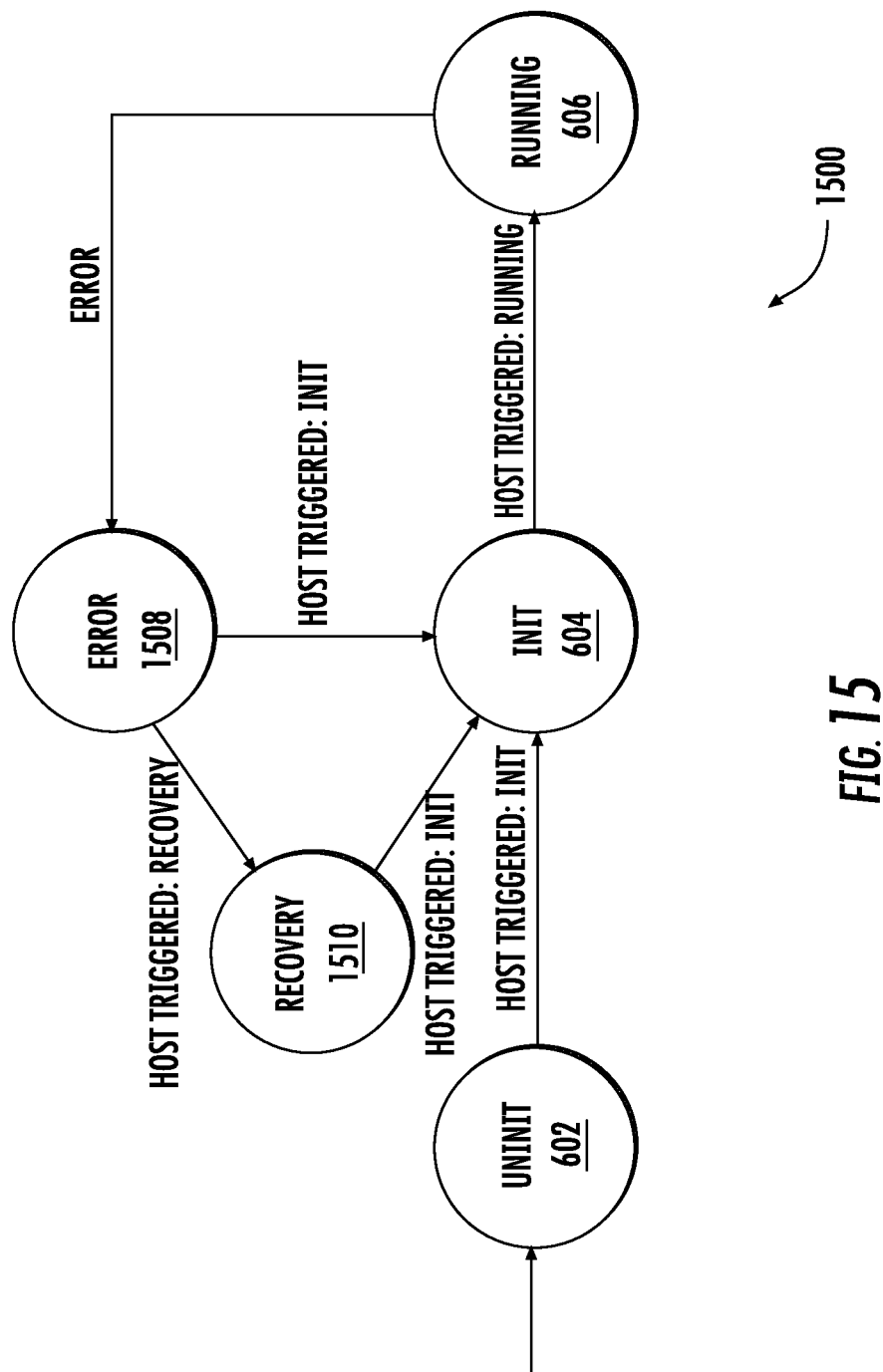
FIG. 15 is a logical block diagram of an exemplary run time operation state machine which supports error recovery, useful in conjunction with the various described embodiments.

As shown in FIG. 15, some embodiments 1500 may incorporate an Error Recovery state 1510. Specifically, for any error detected in the Run IPC Protocol (which operates similar to the features described with reference to FIG. 6), the IPC state machine moves to the Error State 1508. Thereafter, the host processor may trigger an error recovery procedure by transitioning to the Recovery State 1510. In one embodiment, the peripheral processor includes an error recovery handler which collects last known state and/or protocol information. This recovery information can be used to "rollback" the transactions to the most recent recoverable state, thereby allowing the transaction to gracefully exit (or continue). Certain types of ongoing data transfer errors can be detected via hardware/software mechanisms like DMA completion error, polling link state, etc.

In one exemplary embodiment, the host triggers transition to the Recovery State 1510 by writing Recovery to the IPC Control register. Responsively, the peripheral processor collects the reliable tail pointers for all reliable pipes (pipes which were initialized with reliability flags), and updates the Head Pointer Doorbell Array entry with these reliable tail pointer values. The remaining entries in the Head Pointer Doorbell Array are set to zero. The peripheral processor updates the IPC Status to Recovery and sends a notification MSI to the host.

When the host receives the notification, it checks the IPC Status Register to detect change to Recovery State 1510; in the Recovery State, the host executes an appropriate Recovery Protocol to recover any trapped debugging information. Thereafter, the host and the peripheral processor re-initialize the link and appropriate data structures.

Methods

Figure 16:
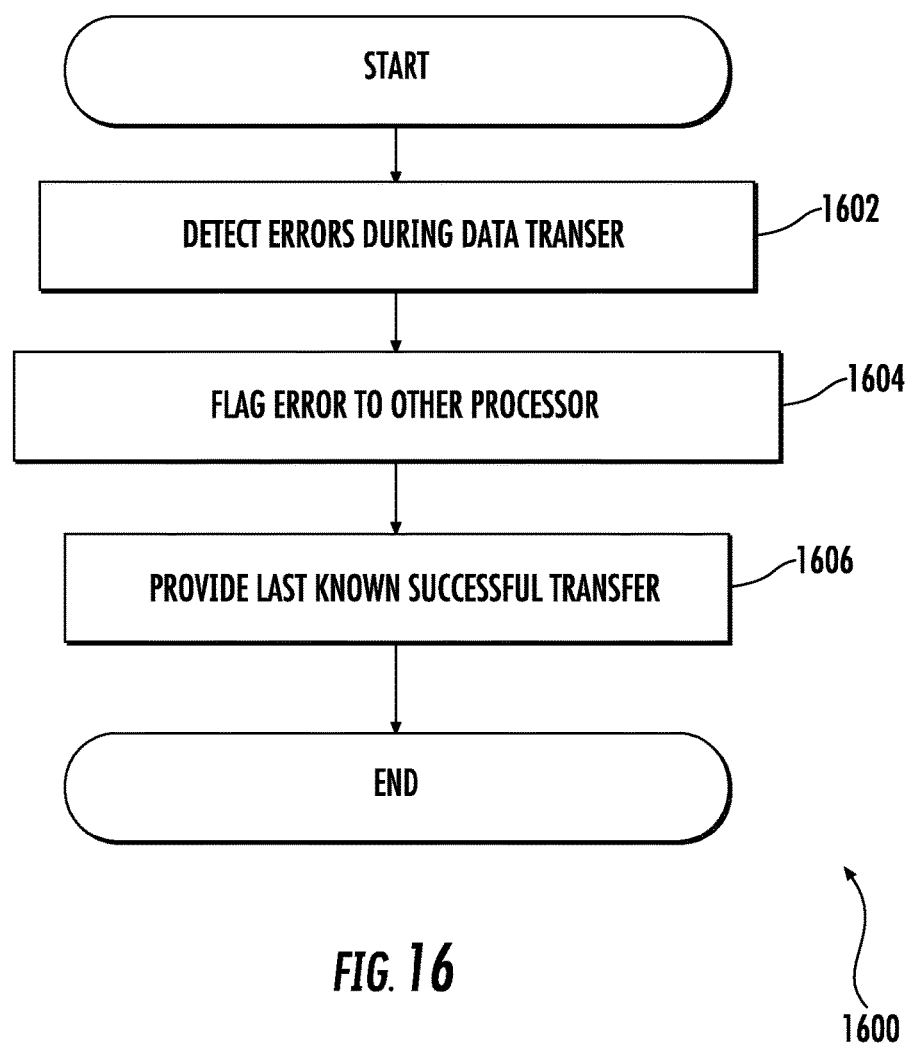
FIG. 16 is a logical flow diagram illustrating a generalized power management process for independently operable processors, in accordance with one embodiment of the present disclosure.

FIG. 16 is a logical flow diagram illustrating one embodiment of a generalized error recovery method 1600 for independently operable processors.

At step 1602 of the method 1600, one or more errors are detected as part of or during a transfer. In one exemplary embodiment, an error is detected when a transfer does not complete in accordance with expectations. For example, a transfer that is expected to have a certain size may be corrupted if the resulting transfer differs in size. Similarly, a transfer that is expected to complete within a specified time interval (or number of cycles, etc.) is considered corrupted if the completion does not occur within the specified time interval/criterion. Examples of other transfer parameters useful with the disclosed embodiment include, without limitation, length of the transfer (or portions thereof), and order/timing (e.g., the sequence in which the transfer or portions thereof occur).

In some implementations, successful transfer may be determined based at least in part on explicit signaling (e.g., acknowledgments, non-acknowledgments, proper identification, etc.) Thus, the lack of explicit signaling, malformed signaling, signaling that is not timely, and/or signaling that does not bear expected or proper source or data identifications, may indicate one or more corrupted transactions.

In some embodiments, errors may be detected, at least in part, by verifying that the received data complies with certain format requirements. Formats may specify certain field codes, encoding rules, ordering of constituent data, etc. In some variants, data formats can be used to assist in reconstructing the originally received data. In certain such variants, error correction may be attempted before concluding that an error has been detected. Common examples of error correction schemes include forward error correction (FEC), parity, cyclic redundancy (CRC), hamming and/or parity codes.

Artisans of ordinary skill in the related arts will also readily appreciate that certain transactions may span multiple data pipes. Thus, in certain instances, an unsuccessful transaction may result in multiple data pipes being deemed unreliable.

Returning to FIG. 16, at step 1604 of the method 1600, an error is flagged or indicated to at least one other processor. In one such embodiment, detected errors may be logged for analysis. In some variants, the errors are only logged at specified periods of activity or types of scenarios or events. In other variants, the detected errors are accumulated over a history of operation. For example, certain behaviors may not be readily discernible from a limited number of errors (discovery may be difficult to ascertain where the records consist of a small sample size), but may become apparent when considered within the context of a larger number of/multiple transactions.

It will also be appreciated that indirect indication or "flagging" can be used consistent with the disclosure, such as where an intermediary device or location is used by the recipient processor to indirectly divine that the error occurred, without explicit signaling from another entity. For instance, a register or memory location might be read by the recipient processor, the contents of the data read indicating the presence of the error without any direct signaling or messaging.

In one exemplary embodiment, the transfer is based at least in part on the contents of one or more transfer descriptor rings (TDRs), which comprise one or more transfer descriptors (TDs). Each TD represents a virtualized data pipe which includes at least one field that identifies when a successful transfer completion occurs. In one variant of the present disclosure, reliable tail pointers refer to data streams that have successfully completed according to the virtualized data pipe.

At step 1606 of the method 1600, when another processor requests recovery, the processor returns the state(s) of the last successful transfer(s). In one exemplary embodiment, the processor additionally collects (or may provide) the "reliable" tail pointers for all reliable pipes. In some cases, the data within an unreliable data pipe may be replicated so as to provide e.g., guaranteed delivery of the previously lost data.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A non-transitory computer-readable storage apparatus comprising a storage medium, the storage medium comprising computer-readable instructions that are configured to, when executed by a first digital processor apparatus:
   prior to transmission of a boot state image to a second digital processor apparatus, determine a current stage of execution for the second digital processor apparatus by a read operation of a shared memory interface by the first digital processor apparatus; and
   cause the first digital processor apparatus to transmit the boot stage image to the second digital processor apparatus via a physical bus interface.

2. The non-transitory computer-readable storage apparatus of claim 1, wherein the computer-readable instructions are further configured to, when executed by the first digital processor apparatus:
   prior to transmission of the boot state image to the second digital processor apparatus, detect the physical bus interface and enumerate the second digital processor apparatus;
   wherein the enumeration of the second digital processor apparatus comprises an initial query of one or more devices connected to the first digital processor apparatus and an assignment of an address for the second digital processor apparatus.

3. The non-transitory computer-readable storage apparatus of claim 1, wherein the transmission of the boot stage image to the second digital processor apparatus further comprises a map of the boot state image to the shared memory interface; and
   wherein the computer-readable instructions are further configured to, when executed by the first digital processor apparatus:
   subsequent to the map of the boot state image to the shared memory interface, perform a write operation to a doorbell register of the shared memory interface, the write operation to the doorbell register comprising a notification of the map of the boot state image to the shared memory interface.

4. The non-transitory computer-readable storage apparatus of claim 1, wherein the computer-readable instructions is further configured to, when executed by the first digital processor apparatus:
   perform a read operation on an image response register; and
   determine a completion status for a boot sequence for the second digital processor apparatus based on the performed read operation.

5. Integrated circuit apparatus comprising:
   a host processor apparatus;
   an auxiliary processor apparatus; and
   a shared memory interface comprising at least one data storage device, the shared memory interface in data communication with each of the host processor apparatus and the auxiliary processor apparatus, the shared memory interface configured to provide a multi-channel inter-processor communication link configured to enable data transfers between the host processor apparatus and the auxiliary processor apparatus;
   wherein the integrated circuit apparatus is further configured to:
   prior to transmission of a boot stage image to the auxiliary processor apparatus, determine a current stage of execution for the auxiliary processor apparatus by a read operation of the shared memory interface by the host processor apparatus; and
   cause the host processor apparatus to transmit the boot stage image to the auxiliary processor apparatus via a physical bus interface.

6. The integrated circuit apparatus of claim 5, wherein the shared memory interface is configured to remain functional when one of the host processor apparatus or the auxiliary processor apparatus is asleep.

7. The integrated circuit apparatus of claim 5, wherein the multi-channel inter-processor communication link supports a host-driven boot protocol that is utilized during a boot sequence for the integrated circuit apparatus.

8. The integrated circuit apparatus of claim 5, wherein the transmission of the boot stage image to the auxiliary processor apparatus further comprises a map of the boot stage image to the shared memory interface by the host processor apparatus.

9. The integrated circuit apparatus of claim 8, wherein subsequent to the map of the boot stage image to the shared memory interface, perform a write operation to a doorbell register of the shared memory interface by the host processor apparatus, the write operation to the doorbell register comprising a notification of the map of the boot image to the shared memory interface.

10. The integrated circuit apparatus of claim 9, wherein subsequent to the write operation to the doorbell register, the host processor apparatus performs a read operation on an image response register, the read operation on the image response register comprising a determination of a completion status for a boot sequence for the auxiliary processor apparatus.

11. The integrated circuit apparatus of claim 5, wherein the transmission of the boot stage image to the auxiliary processor apparatus comprises provision of a base address and image size for the boot stage image within a contiguous memory space by the host processor apparatus.

12. The integrated circuit apparatus of claim 11, wherein the determination of the current stage of execution for the auxiliary processor apparatus comprises a read of a register within the shared memory interface by the host processor apparatus.

13. The integrated circuit apparatus of claim 12, wherein the auxiliary processor apparatus is configured to report a success or failure status for execution of the boot stage image prior to the auxiliary processor apparatus switching to run time operation.

14. A peripheral processor apparatus, comprising:
   an endpoint apparatus configured to be coupled to a physical bus interface;
   a processing element in communication with the endpoint apparatus; and
   a communication interface coupled to a shared memory space;
   wherein the peripheral processor apparatus is configured to:
      cause execution of an initial primary boot sequence;
      update a current execution stage for the peripheral processor apparatus by writing to the shared memory space, the update of the current execution stage configured to notify a host processor apparatus of the current execution stage for the peripheral processor apparatus;
      responsive to the update of the current execution stage in the shared memory space, receive a notification from the host processor apparatus; and
      responsive to receipt of the notification, retrieve a secondary boot image.

15. The peripheral processor apparatus of claim 14, wherein the receipt of the notification from the host processor apparatus comprises a read operation of a doorbell register associated with the shared memory space between the host processor apparatus and the peripheral processor apparatus.

16. The peripheral processor apparatus of claim 15, wherein the read operation of the doorbell register comprises a read of an image address register and an image size register of the shared memory space.

17. The peripheral processor apparatus of claim 14, wherein the peripheral processor apparatus is further configured to verify the secondary boot image using a validation procedure prior to the retrieval of the secondary boot image.

18. The peripheral processor apparatus of claim 17, wherein subsequent to retrieval of the secondary boot image, the peripheral processor apparatus is configured to write to a notification register on the shared memory space between the host processor apparatus and the peripheral processor apparatus.

19. The peripheral processor apparatus of claim 18, wherein subsequent to the write of the notification register, the peripheral processor apparatus is configured to execute the secondary boot image.

20. The peripheral processor apparatus of claim 19, wherein subsequent to the execution of the secondary boot image, the peripheral processor apparatus is configured to notify the host processor apparatus via an interrupt of successful execution of the secondary boot image.

* * * * *